US008907793B2

(12) United States Patent
Mostov

(10) Patent No.: US 8,907,793 B2
(45) Date of Patent: *Dec. 9, 2014

(54) TRANSPORTATION SECURITY SYSTEM AND ASSOCIATED METHODS

(71) Applicant: Kirsen Technologies, LLC, Berkeley, CA (US)

(72) Inventor: Kirill Mostov, Berkeley, CA (US)

(73) Assignee: Kirsen Technologies, LLC, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,387

(22) Filed: Jan. 27, 2014

(65) Prior Publication Data

US 2014/0139338 A1 May 22, 2014

Related U.S. Application Data

(60) Division of application No. 13/767,736, filed on Feb. 14, 2013, now Pat. No. 8,643,503, which is a (Continued)

(51) Int. Cl.
| | |
|---|---|
| *G08B 13/14* | (2006.01) |
| *F16M 13/02* | (2006.01) |
| *G08B 25/08* | (2006.01) |
| *G08B 13/02* | (2006.01) |
| *G06Q 10/08* | (2012.01) |
| *G08B 25/10* | (2006.01) |
| *G08B 13/22* | (2006.01) |
| *G08B 21/02* | (2006.01) |
| *G08B 25/00* | (2006.01) |

(52) U.S. Cl.
CPC ............... *G08B 13/02* (2013.01); *F16M 13/02* (2013.01); *G08B 25/08* (2013.01); *G06Q 10/0833* (2013.01); *G08B 25/10* (2013.01); *G08B 13/22* (2013.01); *G08B 21/0269* (2013.01); *G08B 25/009* (2013.01)
USPC ........ 340/568.1; 340/500; 340/540; 340/541; 340/539.13

(58) Field of Classification Search
CPC combination set(s) only.
See application file for complete search history.

(56) References Cited

U.S. PATENT DOCUMENTS

| | | | |
|---|---|---|---|
| 3,889,627 A | 6/1975 | Cloyd et al. | |
| 4,792,796 A | 12/1988 | Bradshaw et al. | |

(Continued)

FOREIGN PATENT DOCUMENTS

WO WO 2005091014 A1 9/2005

OTHER PUBLICATIONS

U.S. Appl. No. 11/343,560; Notice of Allowance, Mar. 24, 2011.

(Continued)

*Primary Examiner* — Travis Hunnings
(74) *Attorney, Agent, or Firm* — Orrick, Herrington & Sutcliffe LLP

(57) ABSTRACT

A security system for monitoring a shipping container being transported on a cargo transport vehicle and methods for making and using same. A mounting device removably couples a container security device (CSD) to the cargo container. Monitoring cargo inside the container and detecting vehicle intrusions and container damage, the CSD includes an anti-tamper sensor, a microcontroller, a communication device, and a plurality of accelerometers and strain gages. The microcontroller generates an alarm signal based on output data from the anti-tamper sensor and records container events. The anti-temper sensor undergoes individual and integrated sensor processing procedures; whereas, the integrated sensor processing procedure determines a container alert status. The accelerometers and strain gages define a moment of inertia of the cargo container. Communicating with a telecommunications network, a network operations center of the security system receives data from the CSD for storage and creating an archive of the container events.

8 Claims, 28 Drawing Sheets

Related U.S. Application Data continuation-in-part of application No. 13/444,690, filed on Apr. 11, 2012, now abandoned, which is a continuation of application No. 13/195,637, filed on Aug. 1, 2011, now Pat. No. 8,164,458, which is a continuation of application No. 11/343,560, filed on Jan. 30, 2006, now Pat. No. 7,990,270.

(60) Provisional application No. 60/648,260, filed on Jan. 28, 2005.

(56) References Cited

U.S. PATENT DOCUMENTS

| | | | |
|---|---|---|---|
| 4,821,291 A | 4/1989 | Stevens et al. | |
| 4,879,756 A | 11/1989 | Stevens et al. | |
| 4,926,868 A | 5/1990 | Larsen | |
| 4,937,586 A | 6/1990 | Stevens et al. | |
| 4,992,656 A | 2/1991 | Clauser | |
| 5,177,432 A | 1/1993 | Waterhouse et al. | |
| 5,245,534 A | 9/1993 | Waterhouse et al. | |
| 5,374,815 A | 12/1994 | Waterhouse et al. | |
| 5,406,842 A | 4/1995 | Locke | |
| 5,472,309 A | 12/1995 | Bernard et al. | |
| 5,507,291 A | 4/1996 | Stirbl et al. | |
| 5,531,290 A | 7/1996 | Furuichi et al. | |
| 5,532,465 A | 7/1996 | Waterhouse et al. | |
| 5,533,606 A | 7/1996 | Yuyama | |
| 5,646,616 A | 7/1997 | Komatsu | |
| 5,670,886 A | 9/1997 | Wolff et al. | |
| 5,875,434 A | 2/1999 | Matsuoka et al. | |
| 5,877,962 A | 3/1999 | Radcliffe | |
| 5,905,380 A | 5/1999 | Weiner et al. | |
| 5,943,841 A | 8/1999 | Wunscher | |
| 6,032,127 A | 2/2000 | Schkolnick et al. | |
| 6,208,908 B1 | 3/2001 | Boyd et al. | |
| 6,308,109 B1 | 10/2001 | Yuyama et al. | |
| 6,480,103 B1 | 11/2002 | McCarthy et al. | |
| 6,501,390 B1 | 12/2002 | Chainer et al. | |
| 6,505,093 B1 | 1/2003 | Thatcher et al. | |
| 6,573,732 B1 | 6/2003 | Reimer | |
| 6,628,992 B2 | 9/2003 | Osburn, III | |
| 6,662,649 B1 | 12/2003 | Knight et al. | |
| 6,701,286 B2 | 3/2004 | Kauppila | |
| 6,847,892 B2 | 1/2005 | Zhou et al. | |
| 6,879,257 B2 | 4/2005 | Hisano et al. | |
| 6,907,331 B2 | 6/2005 | Paquet | |
| 6,919,803 B2 | 7/2005 | Breed | |
| 6,927,728 B2 | 8/2005 | Vook et al. | |
| 7,002,472 B2 | 2/2006 | Stratmoen et al. | |
| 7,028,861 B2 | 4/2006 | Sayers et al. | |
| 7,046,015 B2 | 5/2006 | Suginouchi et al. | |
| 7,049,963 B2 | 5/2006 | Waterhouse et al. | |
| 7,088,290 B2 | 8/2006 | Ohno et al. | |
| 7,098,645 B1 | 8/2006 | Zhu et al. | |
| 7,098,784 B2 * | 8/2006 | Easley et al. | 340/539.13 |
| 7,256,694 B2 | 8/2007 | Papari et al. | |
| 7,315,246 B2 * | 1/2008 | Rajapakse et al. | 340/549 |
| 7,317,387 B1 * | 1/2008 | Cova et al. | 340/539.1 |
| 7,339,469 B2 | 3/2008 | Braun | |
| 7,538,672 B2 * | 5/2009 | Lockyer et al. | 340/545.6 |
| 7,649,459 B2 * | 1/2010 | Hewitt et al. | 340/572.1 |
| 7,990,270 B2 * | 8/2011 | Mostov | 340/572.1 |
| 8,115,472 B2 | 2/2012 | Mostov | |
| 8,164,458 B2 * | 4/2012 | Mostov | 340/572.1 |
| 8,643,503 B2 * | 2/2014 | Mostov | 340/693.5 |
| 2002/0111774 A1 | 8/2002 | Kauppila et al. | |
| 2004/0053641 A1 | 3/2004 | Leung et al. | |
| 2004/0069849 A1 | 4/2004 | Stevens et al. | |
| 2004/0100379 A1 * | 5/2004 | Boman et al. | 340/539.26 |
| 2004/0113783 A1 | 6/2004 | Yagesh | |
| 2004/0149822 A1 | 8/2004 | Stevens et al. | |
| 2004/0201454 A1 | 10/2004 | Waterhouse et al. | |
| 2004/0205350 A1 | 10/2004 | Waterhouse et al. | |
| 2005/0004726 A1 | 1/2005 | Paquet et al. | |
| 2005/0007124 A1 | 1/2005 | Tsuji | |
| 2005/0029149 A1 | 2/2005 | Leung et al. | |
| 2005/0029345 A1 | 2/2005 | Waterhouse et al. | |
| 2005/0043850 A1 | 2/2005 | Stevens et al. | |
| 2005/0073406 A1 * | 4/2005 | Easley et al. | 340/539.1 |
| 2005/0083213 A1 | 4/2005 | Stevens et al. | |
| 2005/0086983 A1 | 4/2005 | Stevens et al. | |
| 2005/0104603 A1 | 5/2005 | Peschmann et al. | |
| 2005/0113703 A1 | 5/2005 | Farringdon et al. | |
| 2005/0149226 A1 | 7/2005 | Stevens et al. | |
| 2005/0156780 A1 | 7/2005 | Bonthron et al. | |
| 2005/0205817 A1 | 9/2005 | Marcichow et al. | |
| 2005/0251330 A1 | 11/2005 | Waterhouse et al. | |
| 2005/0264438 A1 | 12/2005 | Fullerton et al. | |
| 2006/0124662 A1 | 6/2006 | Reynolds et al. | |
| 2006/0128023 A1 | 6/2006 | Stevens et al. | |
| 2006/0164232 A1 | 7/2006 | Waterhouse et al. | |
| 2006/0170584 A1 | 8/2006 | Romero et al. | |
| 2006/0181413 A1 * | 8/2006 | Mostov | 340/539.22 |
| 2006/0220857 A1 | 10/2006 | August et al. | |
| 2006/0232417 A1 | 10/2006 | August et al. | |
| 2006/0258896 A1 | 11/2006 | Haber et al. | |
| 2007/0075074 A1 * | 4/2007 | Jaeger et al. | 220/1.5 |
| 2007/0075076 A1 * | 4/2007 | Hewitt et al. | 220/1.5 |
| 2007/0159327 A1 * | 7/2007 | Belden et al. | 340/568.1 |
| 2007/0171119 A1 | 7/2007 | Dwelly et al. | |
| 2007/0194976 A1 | 8/2007 | Reed et al. | |
| 2007/0194982 A1 | 8/2007 | Stove | |
| 2007/0205937 A1 | 9/2007 | Thompson et al. | |
| 2008/0211711 A1 | 9/2008 | Mostov et al. | |
| 2009/0102650 A1 * | 4/2009 | Diener et al. | 340/542 |
| 2010/0027737 A1 | 2/2010 | Mostov | |

OTHER PUBLICATIONS

U.S. Appl. No. 11/951,915; Office Action, Feb. 26, 2009.
U.S. Appl. No. 11/951,915; Office Action, Dec. 7, 2009.
U.S. Appl. No. 11/951,915; Office Action, Aug. 31, 2011.
U.S. Appl. No. 11/951,915; Office Action, Mar. 5, 2012.
U.S. Appl. No. 11/951,915; Office Action, Jul. 5, 2013.
U.S. Appl. No. 11/951,915; Office Action, Dec. 16, 2013.
U.S. Appl. No. 12/258,259; Office Action, Sep. 20, 2010.
U.S. Appl. No. 12/258,259; Notice of Allowance, Feb. 3, 2011.
U.S. Appl. No. 12/258,259; Notice of Allowance, Apr. 14, 2011.
U.S. Appl. No. 12/258,259; Notice of Allowance, Oct. 7, 2011.
U.S. Appl. No. 13/195,637; Notice of Allowance, Dec. 16, 2011.
U.S. Appl. No. 13/444,690; Office Action, Aug. 15, 2012.
2007/086664—PCT Search Report and Written Opinion, Jul. 28, 2008.
2007/086664—European Search Report, Nov. 5, 2013.
2007/086664—Supplemental Search Report, Nov. 5, 2013.
2008/081200—PCT Search Report and Written Opinion, Dec. 23, 2008.
2008/084240—PCT Search Report and Written Opinion, Feb. 4, 2009.
2008/084240—Extended European Search Report, Mar. 17, 2011.
2008/084240—Supplementary European Search Report, Apr. 5, 2011.
2008/084240—Extended European Search Report, Aug. 2, 2011.
Toomay, John C. et al., "Radar Principles for The Non-Specialist (passage)", Jan. 1, 2004, pp. 137-138, 2 pages.

* cited by examiner

FIG. 28(a)
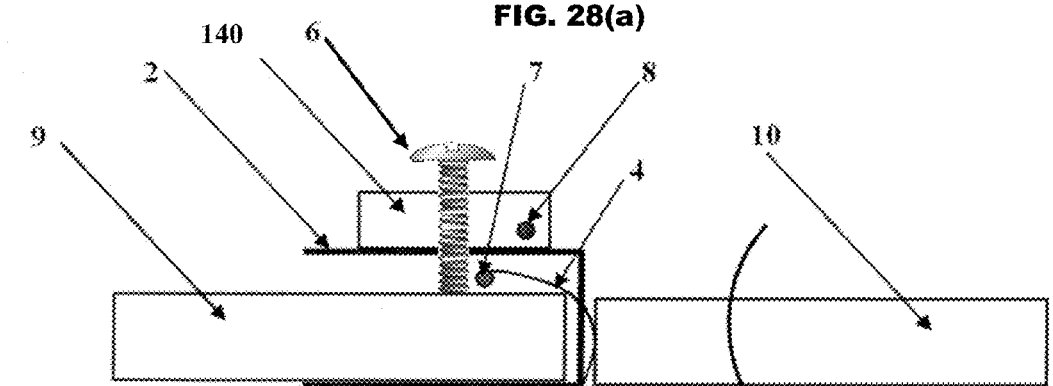
(a)
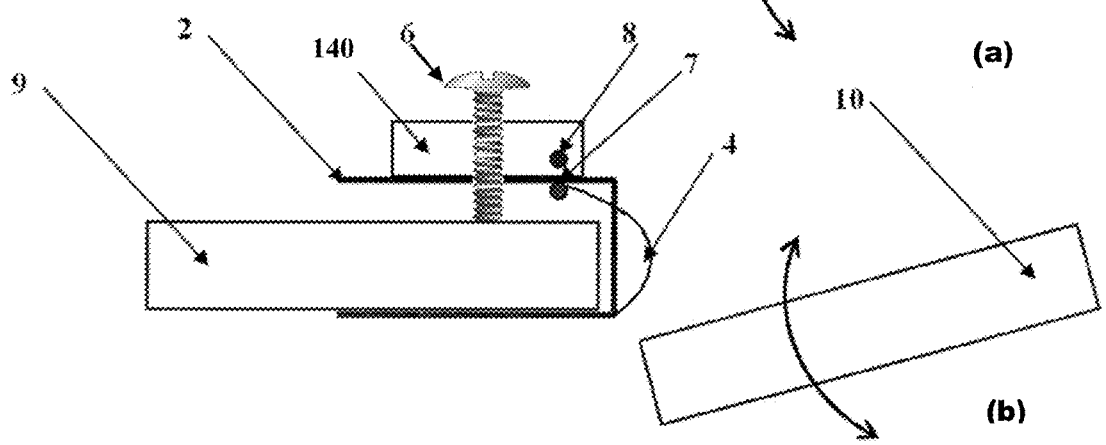
(b)
FIG. 28(b)

TRANSPORTATION SECURITY SYSTEM AND ASSOCIATED METHODS

CROSS-REFERENCE TO RELATED APPLICATIONS

This application is a divisional application of U.S. application Ser. No. 13/767,736, filed on Feb. 14, 2013, which is a continuation-in-part of U.S. application Ser. No. 13/444,690, filed on Apr. 11, 2012, now abandoned, which is a continuation application of U.S. application Ser. No. 13/195,637, filed on Aug. 1, 2011, now U.S. Pat. No. 8,164,458, which is a continuation application of U.S. application Ser. No. 11/343,560, filed on Jan. 30, 2006, now U.S. Pat. No. 7,990,270, which claims the benefit of U.S. Provisional Application Ser. No. 60/648,260, filed on Jan. 28, 2005. Priority to each of the prior applications is expressly claimed, and the disclosures of the applications are hereby incorporated herein by reference in their entireties and for all purposes.

BACKGROUND

Cargo loss due to theft has become a serious problem. Cargo is often misappropriated by shipping company employees, cargo handlers, and/or security personnel. Many insurance professionals believe that more than half of all major cargo thefts are planned in logistics departments, by employees at the shipper or manufacturer who are thought to be trustworthy. Certain authorities believe that gangs operating in many metropolitan areas are actually training some of their members in logistics so that they will be eligible for employment at desirable trucking, warehousing, or forwarding firms.

Because of the emergence of terrorist threats and activities, container security has become a national security issue. Terrorists are exploiting transportation modalities such as air, rail, truck-trailer, vessel-barge and bus. As evidenced by recent attacks, terrorists are directing, or seeking to direct, mobile transportation assets into office building and/or other heavily populated areas.

Shipping containers may also be used by terrorists for the arms shipments. Of greatest concern is the shipment of nuclear, chemical, or biological materials that can be used to produce weapons of mass destruction. Some of these materials are relatively small in size and could be hidden in shipping containers without being detected by governmental authorities. If such weapons were to fall into the wrong hands, the results could be devastating.

With the above scenarios in mind, improving container security is desired. In one approach that is commonly in use, a locking mechanism or security seal is applied to container doors to seal the cargo within the container. However, anyone who possesses the key or the combination, whether authorized or not, may gain access to the interior of a container. Further, the locks can be easily picked or removed by other means. Thus, locking devices are a limited deterrent to thieves or terrorists.

In another approach an electronic seal ("e-seal") may be applied to a container. These e-seals are similar to traditional door seals and applied to the containers via the same, albeit weak, door hasp mechanism. These e-seals include an electronic device, such as a radio or radio reflective device that can transmit the e-seal's serial number and a signal if the e-seal is cut or broken after installation. However, the e-seal does not communicate with the interior or contents of the container and does not transmit information related to the interior or contents to other devices.

The e-seal typically employs either a low power radio transceiver or uses radio frequency backscatter techniques to convey information from an e-seal to a reader installed at, for example, a terminal gate. The radio frequency backscatter technique involves use of a relatively expensive, narrow band, high-power radio technology based on a combination of radar and radiobroadcast technologies. The radio frequency backscatter technology requires that a reader send a radio signal of relatively high transmitted power (i.e., 0.5-3 W) that is reflected or scattered back to the reader with modulated or encoded data from the e-seal.

Furthermore, the e-seals are not effective at monitoring security of the container. For example, other methods of intrusion into the container may occur (e.g. breaching other parts of the container such as the side walls). Further, a biological agent may be implanted into the container through the container's standard air vents.

The secure mounting and timely activation of an electronic device, such as e-seal, may also prove problematic. This problem is partially addressed in United States Patent Application Publication No. US 2007/0075076 (Hewitt, et al.). Typically, a tracking and/or monitoring electronic device is attached to a bracket mounted on the container door. However, activation and deactivation of the electronic device often is voluntary and possibly untimely. For example, once a tracking and/or monitoring electronic device is coupled to a container door, it may not be activated until moments after the container door has been closed. The gap in time between the closing of the container door and the activating of the electronic device may be significant and may present a window of opportunity for potential abuse.

BRIEF DESCRIPTION OF THE DRAWINGS

FIG. 28(a) is an exemplary detail drawing illustrating a top view of one embodiment of the mounting device of FIG. 27, wherein the mounting device is fixed on a first door of a cargo container when a second door of the cargo container is closed.

FIG. 28(b) is an exemplary detail drawing illustrating a top view of the embodiment of the mounting device of FIG. 28(a), wherein the mounting device is fixed on the first door of a cargo container when the second door of the cargo container is opened.

Figure 1:
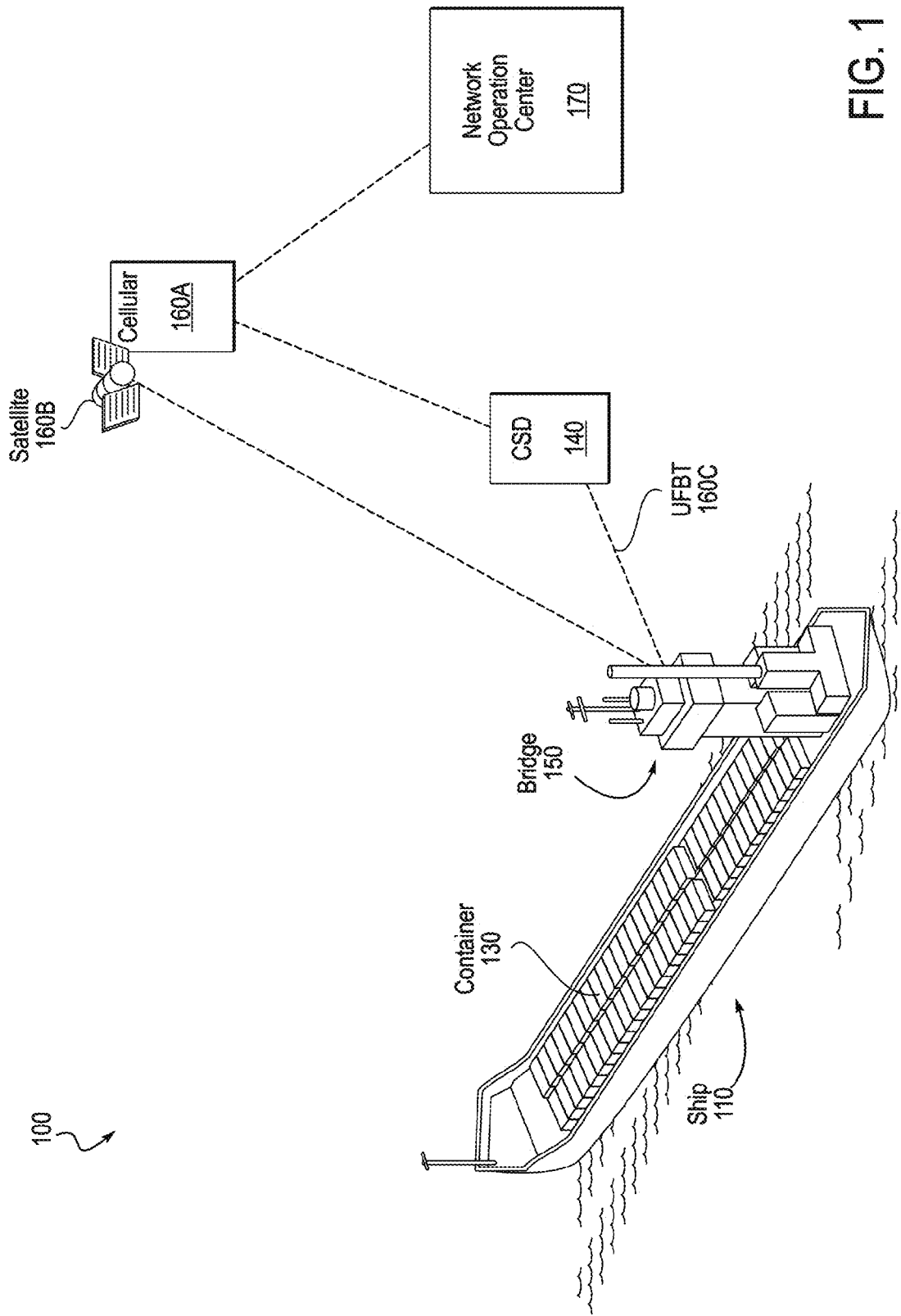
FIG. 1 is an exemplary top-level block diagram illustrating an embodiment of a transportation security system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

The present worldwide transportation security system provides a cost effective and reliable system and method for: (1) registering any event in connection with breach of any wall in a container; (2) detecting an opening, a closing, and/or a removal of the container's doors; (3) monitoring the condition of all seals and locks on the container; (4) monitoring cargo conditions inside the container; (5) detecting a human or an animal inside the container; (6) monitoring the container's movement; (7) detecting weapons of mass destruction in the container; (8) registration of movement inside the container; (9) measuring cargo weight inside the container; (10) registering environmental parameters inside the container (by way of example, the temperature, humidity, smoke, etc.); and/or (11) simultaneously providing means for tracking movements of the container for reasons of security and logistic efficiency. The system may generate false alarms with the probability equal to or better than a magnitude of $10^{-5}$ to $10^{-6}$.

The transportation security system provides an intermodal threat identification, detection, and notification transportation security system. The transportation security system may be applied to any conventional transportation modality, including, but not limited to, air, rail, truck, ship, barge and/or bus transport modes. The instant security system provides an inexpensive mechanism for monitoring each shipping container. Container tampering may be detected and reported rapidly. Thus, the present transportation security system could be a credible defense mechanism against terrorist attempts to smuggle weapons, weapons materials, and/or terrorist personnel by preventing unauthorized access to shipping containers. The threat of cargo theft or piracy is also mitigated. Thus, the present transportation security system provides governmental and law enforcement agencies with a mechanism for responding, in real-time, to cargo theft, piracy, and/or terrorist attacks.

One aspect of the present application is directed toward a security system for monitoring at least one shipping container. The system includes a Container Security Device (CSD) configured to be removably coupled to at least one shipping container. The CSD can be configured to monitor cargo inside the container and detect intrusion of the container. The CSD includes at least one anti-tamper sensor, a microcontroller and a communication device. The microcontroller generates an alert status based on an output signal(s) from a selected sensor. In one embodiment, the output signal(s) are analyzed in accordance with an individual sensor processing procedure and then analyzed in accordance with an integrated sensor processing procedure. The integrated sensor processing procedure makes a decision of the container alert status based on the output status of the sensor. A Network Operations Center (NOC) includes a NOC communications facility configured to communicate with at least one telecommunication network. The NOC being configured to receive data from one or more CSDs. The NOC includes a data storage medium configured to store sensor data and contain an archive of container events.

In another aspect, the present application discloses a transportation security system for monitoring a plurality of shipping containers being transported by one or more cargo transport vehicles. Each of the plurality of cargo vehicles transports at least one shipping container. The system includes a CSD removably coupled to at least one freight shipping container for monitoring a cargo inside the container and detection of intrusion violations. The CSD includes at least one sensor. The CSD also includes a microcontroller and communication device. The system may also include a plurality of bridges. Each of the bridges may be disposed in one cargo transport vehicle. Each of the bridges may include a communication system being configured to communicate with the CSDs and a NOC. The bridges may also include a data storage medium configured to store data pertaining to container events. A NOC communicates with each of the plurality of bridges and CSDs. The NOC may receive data from one or more of the plurality of bridges and CSDs. The NOC includes a data storage medium configured to store one or more of sensor data and container events.

In another aspect, the present application discloses a method for monitoring at least one shipping container being transported by at least one cargo transport vehicle. The method includes providing a CSD configured to be removably coupled to the at least one shipping container for monitoring a cargo inside the container and detecting intrusion violations. The CSD includes at least one sensor. The CSD includes a microcontroller and a CSD communications device. The method may also include sending output data obtained from at least one sensor to the microcontroller.

In another aspect, the present application discloses a method for monitoring at least one shipping container being transported by at least one cargo transport vehicle from a point of origin to a destination point. The method includes providing route data corresponding to the path traversed by a selected cargo transport vehicle from a point of origin to a destination point. An actual position of at least one cargo vehicle is monitored to determine whether the actual position of the vehicle corresponds to the route data. An alert status condition is generated when the actual position of the vehicle does not correspond to the route data. A NOC is notified of the alert status.

In another aspect, the present application discloses a computer-readable medium having stored thereon a data structure for packetizing data transmitted between a CSD and a bridge. In one embodiment, the CSD is removably coupled to at least one shipping container disposed on a cargo transport vehicle. The bridge is disposed on the cargo transport vehicle. The data structure includes: a container CSD identification field containing data that uniquely identifies the container CSD; and a field containing either CSD status data or bridge command data depending on a course of the packet.

In another aspect, the present application discloses a computer-readable medium having stored thereon a data structure for packetizing data being transmitted between a bridge and a NOC. In one embodiment, the bridge is configured to monitor at least one container CSD configured to be removably coupled to the at least one freight shipping container disposed on a cargo transport vehicle. The bridge can be disposed on the cargo transport vehicle. The data structure includes: a bridge identification field containing data that uniquely identifies the container CSD; and a field containing either bridge-status or the NOC command data depending on the source of the packet.

In another aspect, the present application discloses a personal conditions monitoring system. The system includes a monitoring module. The monitoring module includes sensor array and ADC. The system includes a communication subsystem and a power subsystem with replaceable batteries. The communication subsystem includes a transceiver and an antenna.

In another aspect, the present application discloses a mounting device for coupling the CSD to a selected cargo container. The mounting device comprises a bracket configured for fastening the device on a door of the cargo container. In one embodiment, the mounting device is coupled to the door of the cargo container, wherein the CSD remains on the inside of the cargo container. The mounting device includes a magnetically-operated switch for automatically activating and deactivating the CSD when the door is closed and opened, respectively. Thus, once the mounting device is fastened to the cargo container door, the CSD will automatically activate when the cargo container door is closed, minimizing the gap in time between the closing of the door and the activating of the CSD, and thus effectively eliminating any window of opportunity for potential for theft, breach, and/or abuse. Further, the mounting device is easy to install.

Additional features and advantages of the system will be set forth in the detailed description which follows, and in part will be readily apparent to those skilled in the art from the description or recognized by practicing the system as described herein, including the detailed description which follows, the claims and the drawings.

FIG. 1 shows one exemplary embodiment of a transportation security system 100. Each mode of transportation (e.g., transportation by ship 110) is monitored and tracked using the transportation security system 100. The ship 110 is illustratively shown carrying a plurality of shipping containers 130. Each shipping container 130 comprises a Container Security Device ("CSD") 140 for communicating with a Network Operations Center ("NOC") 170, preferably via a Bridge 150. When the CSD 140 detects a break-in violation, an alert status is generated and transmitted to NOC 170, via the Bridge 150. In one embodiment, the CSD 140 communicates with the Bridge 150 using an Unlicensed International Frequency Band Local Area Communication Network 160C. In another embodiment, if the CSD 140 unable to communicate with the NOC 170 through the Bridge 150, the CSD 140 may communicate with the NOC 170 via a cellular communications channel 160A or a satellite communication channel 160B. The alert status generated by the CSD 140, when onboard a ship for example, includes the identity of the container 130. The alert status generated by the CSD 140 may also include the location of the ship 110, the time and date of the alert status generation, and a description of the alert status. The NOC 170, upon receipt of the alert status, may either confirm or reject the alert status. If the alert status is confirmed, the NOC 170 may generate an alarm signal.

Figure 2:
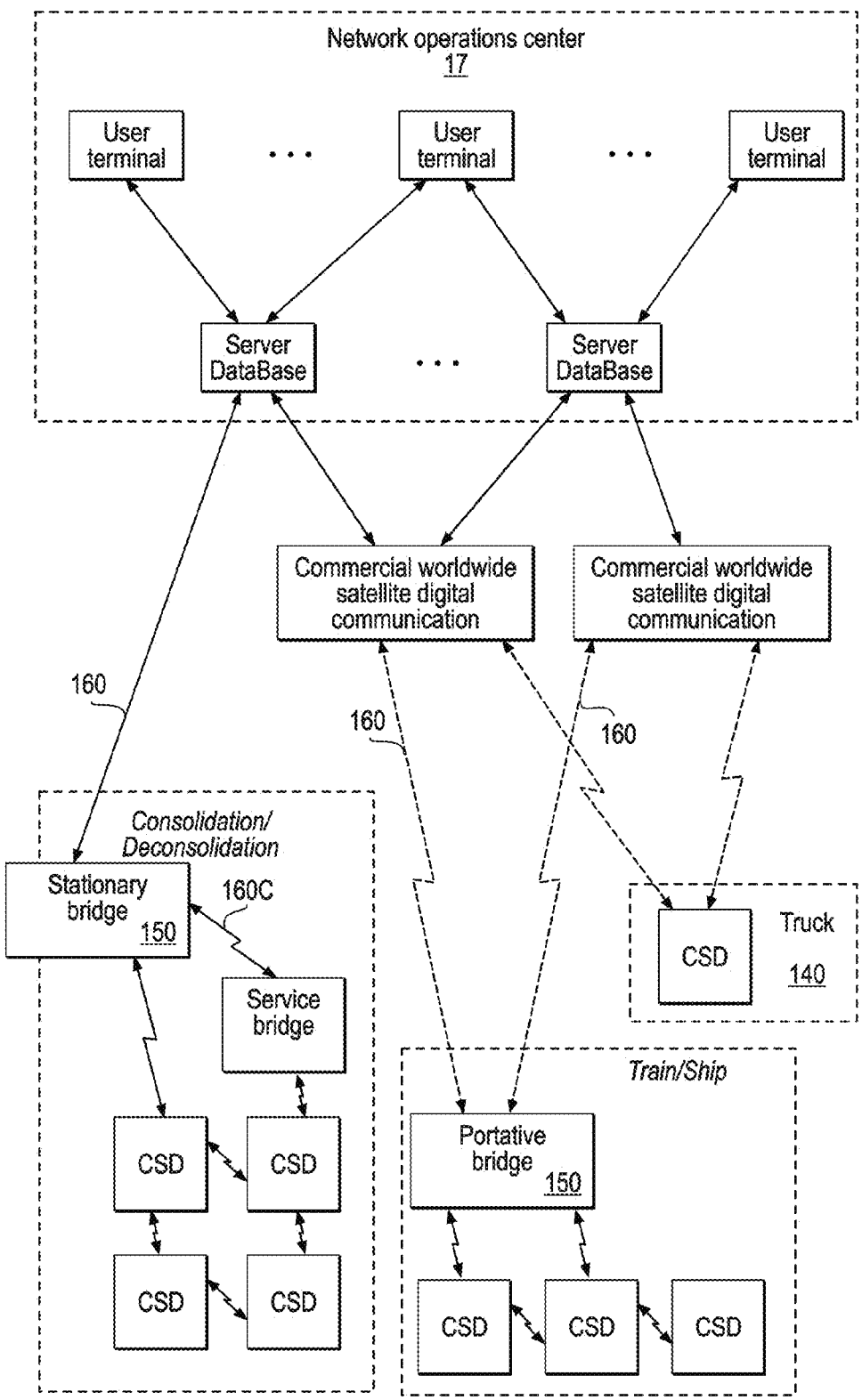
FIG. 2 is a block diagram of the transportation security system depicted in FIG. 1.

FIG. 2 is a block diagram that provides further detail regarding one embodiment of the transportation security system 100 of FIG. 1. In particular, FIG. 2 illustratively shows communication between CSD 140, NOC 170 and Bridge 150 in further detail. In this example, the CSD 140 is shown communicating with the NOC 170 via satellite communications. In another embodiment, the Bridge 150 may also communicate with the NOC 170 via cellular 160A connection (shown in FIG. 1) or via an Ethernet connection 160D.

Figure 3:
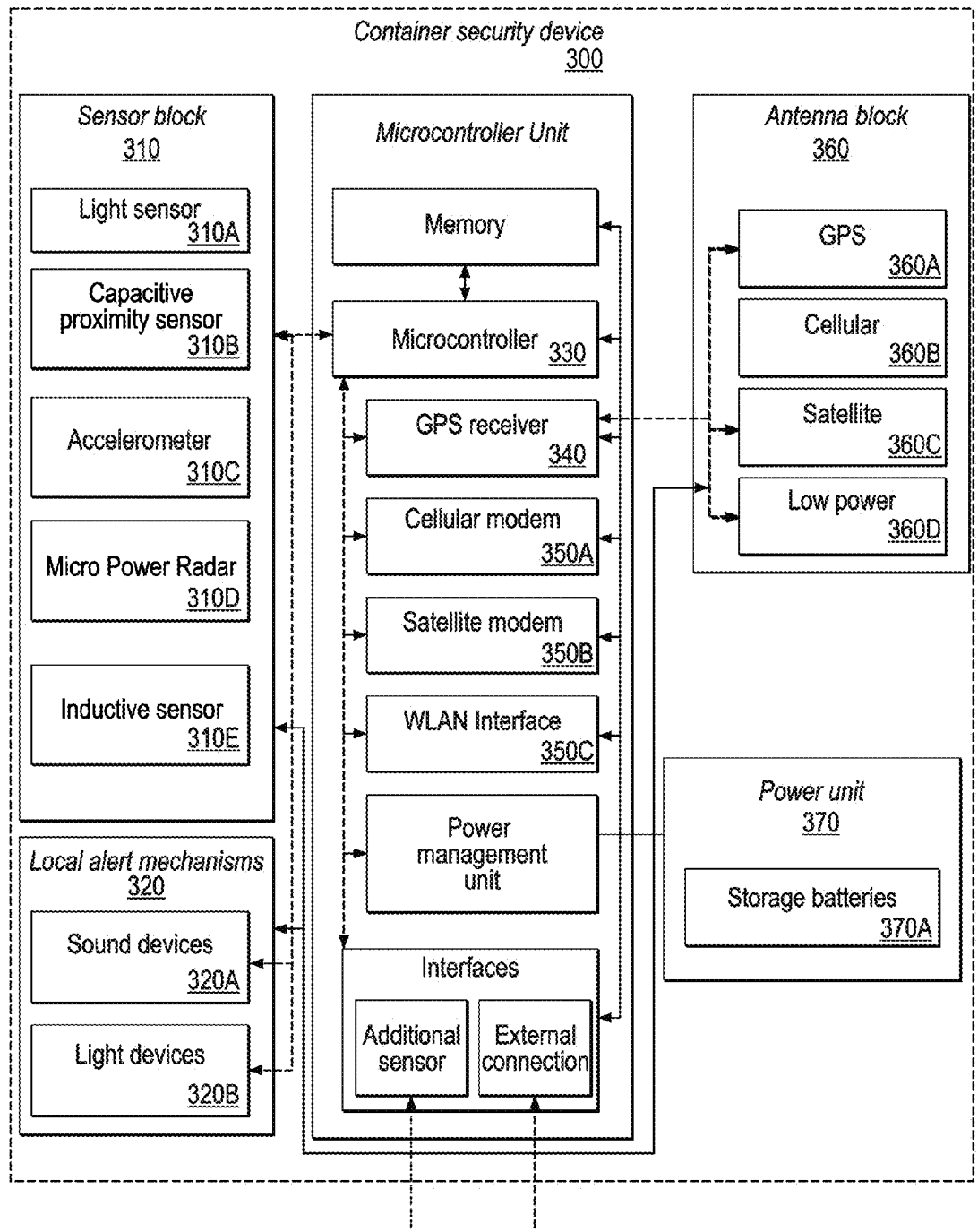
FIG. 3 is a block diagram of a Container Security Device (CSD).

FIG. 3 is a block diagram illustrating one exemplary embodiment of CSD 300. CSD 300 may, for example, represent CSD 140 of FIG. 1. The CSD 300 comprises a Sensor Block 310, local alert mechanisms 320, a Microcontroller Unit 330, a GPS receiver 340, a Cellular Modem 350A, a Satellite Modem 350B, a wireless LAN (WLAN) Interface 350C, an Antenna Block 360 and/or a Power Unit 370. The WLAN Interface 350C uses one of the standard type Unlicensed International Frequency transceiver, by way of example, Bluetooth, Zigbee, etc.

Figure 4:
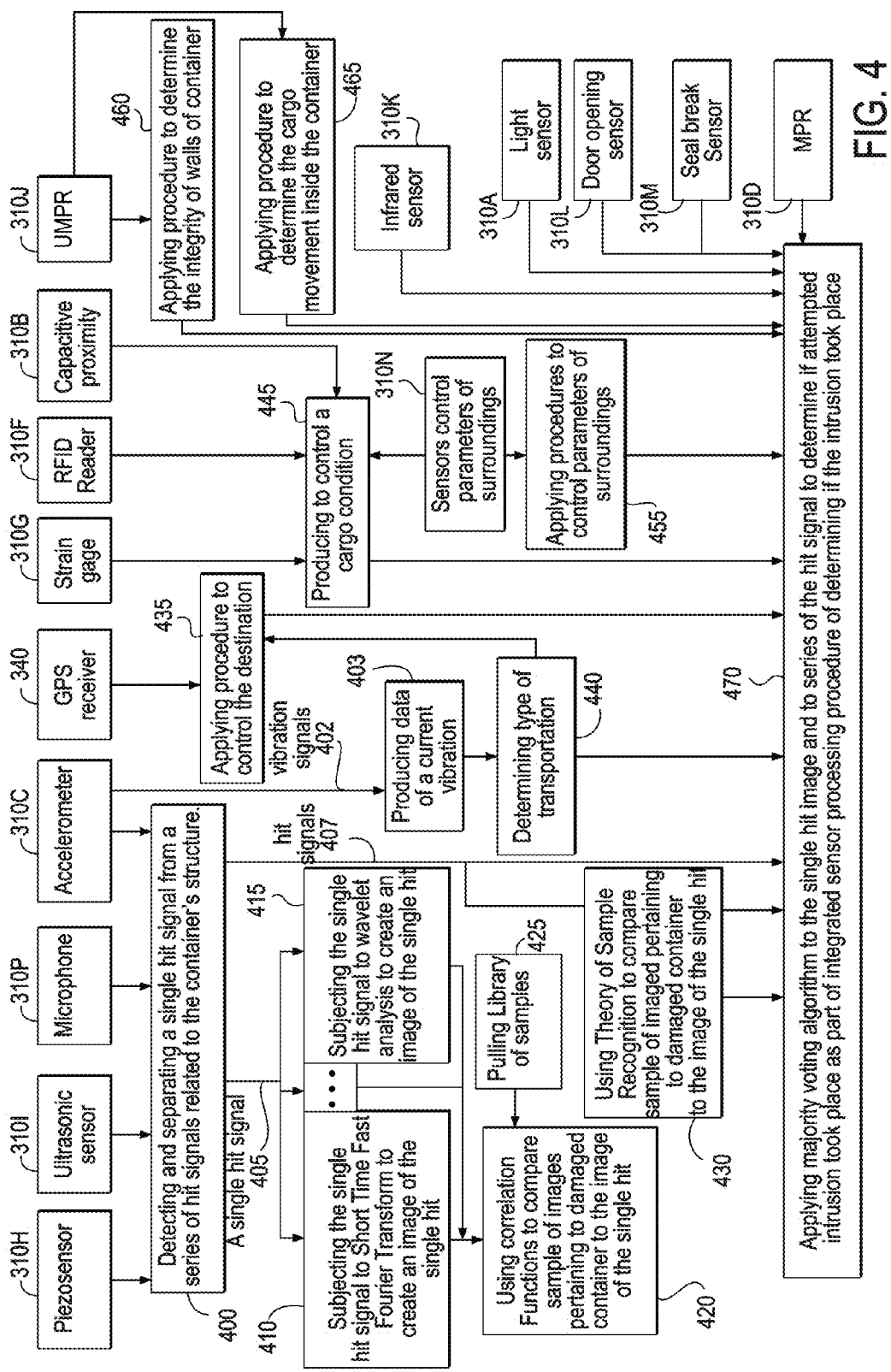
FIG. 4 is a flowchart illustrating one exemplary method for detecting and registering a container intrusion signal.

The Sensor Block 310 may comprise a Light Sensor 310A, a Capacitive Proximity Sensor 310B, an Accelerometer 310C, a Micro Power Radar (MPR) 310D, and/or an Inductive Sensor 310E. The Sensor Block 310 may also include one or more of: a radio-frequency identification (RFID) reader 310F, a Strain Gage 310G, a Piezosensor 310H, an Ultrasonic Sensor 310I, a Microphone 310P, an Ultrasound Micropower Radar (UMPR) 310J, an Infrared Sensor 310K, a Door Opening Sensor 310L, a Seal Break Sensor 310M, a Sensor control parameters of surrounding 310N, as shown in FIG. 4. Sensor control parameters of surroundings 310N may include one or more of: a Temperature Sensor, a Smoke Detector Sensor, a Humidity Sensor, etc. The Antenna block 360 includes a GPS antenna 360A, a Cellular antenna 360B, a Satellite antenna 360C, and a low power LAN antenna 360D.

In one example of operation, microcontroller 330 monitors output of sensor block 310 to determine an alert status. If an alert status is determined, microcontroller 330 may provide Cellular modem 350A, Satellite modem 350B and/or LAN interface 350C with a formatted message packet. This message packet may, for example, be transmitted from the Antenna block 360 to either the Bridge 150 (shown in FIG. 1, 2) or the NOC 170 (shown in FIGS. 1, 2). Transmission message packets from the Bridge 150 and/or the NOC 170 are received by the Antenna block 360 and directed to one or more of the Cellular modem 350A, the Satellite modem 350B, and the LAN interface 350C. Microcontroller 330 may then process the Bridge 150 and/or the NOC 170 message packet to receive information and/or instructions from the NOC 170, for example.

FIG. 4 is a flowchart illustrating one exemplary method for detecting and registering container intrusion signals (e.g., alert statuses). In one embodiment, Accelerometer 310C, Piezosensor 310H, Ultrasonic sensor 310I, and Microphone 310P output signals that may be monitored by the microcontroller 330 (shown in FIG. 3), which thus identifies sensors 310 that exceed one or more pre-set threshold levels.

Once the container 130 is loaded with its payload, the microcontroller 330 operates in a calibration mode. The walls of the container 130 may be struck several times and 'images' of these hits may be recorded and stored in a pulling library of images 425 in the microcontroller 330 for use as calibration images pertaining to this particular container 130. In one example, one or more exemplary images of intrusion or damage to the container 130 may also be stored in the library of images 425.

The microcontroller 330 identifies signals that exceed certain threshold levels. These signals may be separated by microcontroller 330, at 400, into a single hit signal 405 and/or a series of hit signals 407. Within the microcontroller 330, a Short Time Fast Fourier Analysis can be used to process the single hit signal 405, at 410, and a Wavelet analysis may also be performed, at 415. An image of the single hit signal is then created. Correlation Functions at 420 and Theory of Sample Recognition at 430 are utilized to compare the hit image to the exemplary images stored within the library of images 425. If the microcontroller 330 determines that the single hit image correlates with the images of intrusion into a damaged container, a majority voting algorithm is applied to the single hit image. The majority voting algorithm is a part of an integrated sensor processing procedure 470.

The majority voting algorithm is based on major voting mark of unrelated criteria. Each criterion may be assigned positive and/or negative points. When the majority voting algorithm is applied to the image of the single hit signal, the decision about intrusion attempt is based on voting process based on a sum of all points given during processing of the hit signal image. If the sum of total points given to the hit signal image indicates that an intrusion attempt took place, the single hit image is further analyzed in accordance with the integrated sensor processing procedure 470, which makes a decision as to whether an intrusion occurred.

The majority voting algorithm may also be applied to the series of hit signals 407 at 470. If the sum of total points given during processing of the series of hit signals 407 indicates that intrusion, or even an intrusion attempt, occurred, the series of hit signals 407 are analyzed in accordance with the integrated sensor processing procedure 470, which makes a decision as to whether an intrusion occurred.

If the data processed by integrated sensor processing procedure 470 is incomplete or inconsistent, this data is sent by the CSD 140 to the NOC 170 for a further analysis. In this case the NOC 170 (i.e., not the CSD 140) will make the decision as to whether an intrusion occurred.

The microcontroller 330 may also utilize correlation functions 420 to compare output from the Accelerometer 310C and other sensors like the Piezosensor 310H and/or the Ultrasonic sensor 310I to an exemplary image that corresponds to a signal generating by a metal cutting instrument, for example, stored in the library of images 425. If, at 420, the microcontroller 330 determines that the intrusion signal 420 correlates to the stored signal image generated by a metal cutting instrument, the intrusion signal is then further analyzed in accordance with the integrated sensor processing procedure 470 that makes a decision as to whether an intrusion took place.

Output signals from the accelerometer 310C may also be monitored by microcontroller 330 to detect vibration of the container wall. Once a vibration signal 402 of the container wall is detected by the microcontroller 330, the microcontroller 330 may process, at 403, the vibration signal 402 to produce a wavelet analysis and a "window" Fourier analysis for comparison, at 440, to one or more recorded images of library of images 425 to determine which mode of transportation is used to move the container 130. The integrated sensor processing procedure 470 may then be applied to these signals to determine the mode of transport or whether an intrusion took place.

An output signal from the light sensor 310A may be monitored by the microcontroller 330 to determine intrusion or fire. For example, if the microcontroller 330 determines that the output signal indicates that the measured light within the container exceeds a certain rate of change threshold, the microcontroller 330 may initiate further analysis of the output signal, and/or other sensor signals, to determine whether an intrusion is occurring and/or whether there is a presence of smoke. If the microcontroller 330 determines that an intrusion has occurred and/or smoke is present, the output signal may be further analyzed in accordance with the integrated sensor procedure 470 that makes the decision whether intrusion occurred or not.

Output signals from the capacitive proximity sensor 310B, Strain gage 310G and RFID reader 310F also may be monitored by the microcontroller 330 to detect addition or removal of objects from the container 130. The output signals may, for example, be analyzed by the microcontroller 330, at 445, to detect change in the cargo mass. If change in cargo mass is detected, the capacitive proximity sensor output may be analyzed in accordance with the integrated sensor processing procedure 470, which makes a decision about the alert status of the container 130.

An output signal from the capacitive proximity sensor 310B may be monitored by the microcontroller 330 to determine if any objects are in close proximity to locks and seals of the container 130. If any objects are detected in close proximity to the locks and the seals of the container 130, the output signals from one or more sensors may be further analyzed within the microcontroller 330 to determine whether a break-in has occurred. If a break-in is detected by the microcontroller 330, further analysis of these signals may be made by the integrated sensor processing procedure 470 to make a decision as to whether an intrusion occurred.

Output signals from sensors are monitored by the microcontroller 330 in sensors control parameters of surrounding 310N. These sensors may, for example, include a temperature sensor that produces an output signal which may be monitored by the microcontroller 330 to detect thermal excursions outside one or more predetermined temperature ranges and/or to detect rates of change in temperature that occur outside one or more predefined rates of change. If, for example, the microcontroller 330 determines that the sensed temperature is outside predetermined temperature ranges and/or that the rate of temperature change is outside these predetermined limits, output signals from one or more sensors will be further analyzed by the integrated sensor procedure 470 to decide whether an intrusion occurred.

In another example, an output signal from the smoke detector sensor may be monitored to determine if chemicals are present within the air, and/or air clarity inside the container 130 exceeds a predefined threshold level. If, for example, a chemical is detected within the air, output signals from one or more sensors will be further analyzed by the integrated sensor processing procedure 470 to make decision as to the container 130 alert status.

In another example, an output signal from the UMPR 310J may be monitored by the microcontroller 330 to detect presence of humans or animals within the container 130. If, for example, presence of humans and/or animals is detected, the output signals from one or more sensors may be further processed by the integrated sensor procedure 470 to make a decision as to whether an intrusion occurred. The UMPR 310J may, for example, utilize the Doppler's effect to detect movement inside the container 130. The UMPR 310J may, for example, comprise an ultrasonic transceiver. This sensor may also be used to detect force entry attempts into the container 130, based upon registration of impact drilling, gas-cutting, etc., by utilization of the UMPR 310J as a highly sensitive UMPR-based microphone. The later purpose is accomplished by applying a procedure to determine, at 460, the integrity of the container's wall. If the UMPR 310J output data exceeds the threshold determined in at 460 and 465, application of a procedure to determine the integrity of the walls and the cargo movement inside the container 130 may be applied. The output data of one or more sensors may then be further analyzed within the microcontroller 330 for presence of humans/animals or presence of wall integrity failure. If, for example, presence of humans/animals and/or wall destruction are detected, the output signals from one or more sensors 310 are analyzed in accordance with the integrated sensor procedure 470 to make a decision as to whether an intrusion occurred.

Output signals from sensor MPR 310D may be processed to produce a radioprint (e.g., radio-imprint) based upon locations of the objects inside the container 130. The radioprint may be monitored by microcontroller 330 to detect deviations in object location, by comparing the radioprint to an initial radio print recorded during calibration, for example. Radioprints are built based on the analysis of all reflected signals, including signals reflected by objects that are not located in the direct field of the sensor. If, for example, microcontroller 330 detects deviation between a current radioprint and the radioprint recorded during calibration, the radioprints and output signals from other sensors may be analyzed in accordance with the integrated sensor processing procedure 470 to determine whether an intrusion occurred.

Output signals from the infrared sensor 310K may be monitored by the microcontroller 330 to detect warm objects within the container. If, for example, the microcontroller 330 detects a warm object, the output signal from one or more sensors may be further analyzed, at 465, within the microcontroller 330 to determine the presence of humans or animals by applying procedures that determines movement inside the container 130. If, for example, humans or animals are detected, output signals from one or more sensors may be analyzed in accordance with the integrated sensor processing procedure 470 to make a decision as to whether an intrusion occurred.

An output signal from the GPS receiver 340 may be monitored to determine a location of the CSD 140, and further to determine if this location differs from a programmed route for the container 130. If, for example, the microcontroller 330 determines that the current location differs from the programmed route, the output signal may be further analyzed, at 435, to determine deviation from the programmed route. If, for example, significant deviation from the programmed route is detected, the output signals from one or more sensors may be analyzed in accordance with the integrated sensor processing procedure 470 to make a decision as to whether an intrusion occurred.

In another example, the microcontroller 330 monitors the door opening sensor 310L and the seal break sensor 310M to detect changes in integrity of the doors and seals of the container 130. If the microcontroller 330 detects changes in integrity, the output signals from one or more sensors may be analyzed in accordance with the integrated sensor processing procedure 470 to make a decision as to whether an intrusion occurred.

Considering the workload and low performance of standalone CSD microprocessor stemming from strict limitations to its power consumption, a simple accelerometer signal analysis algorithm could often be employed to determine impacts against the structure of secured container.

Figure 5:
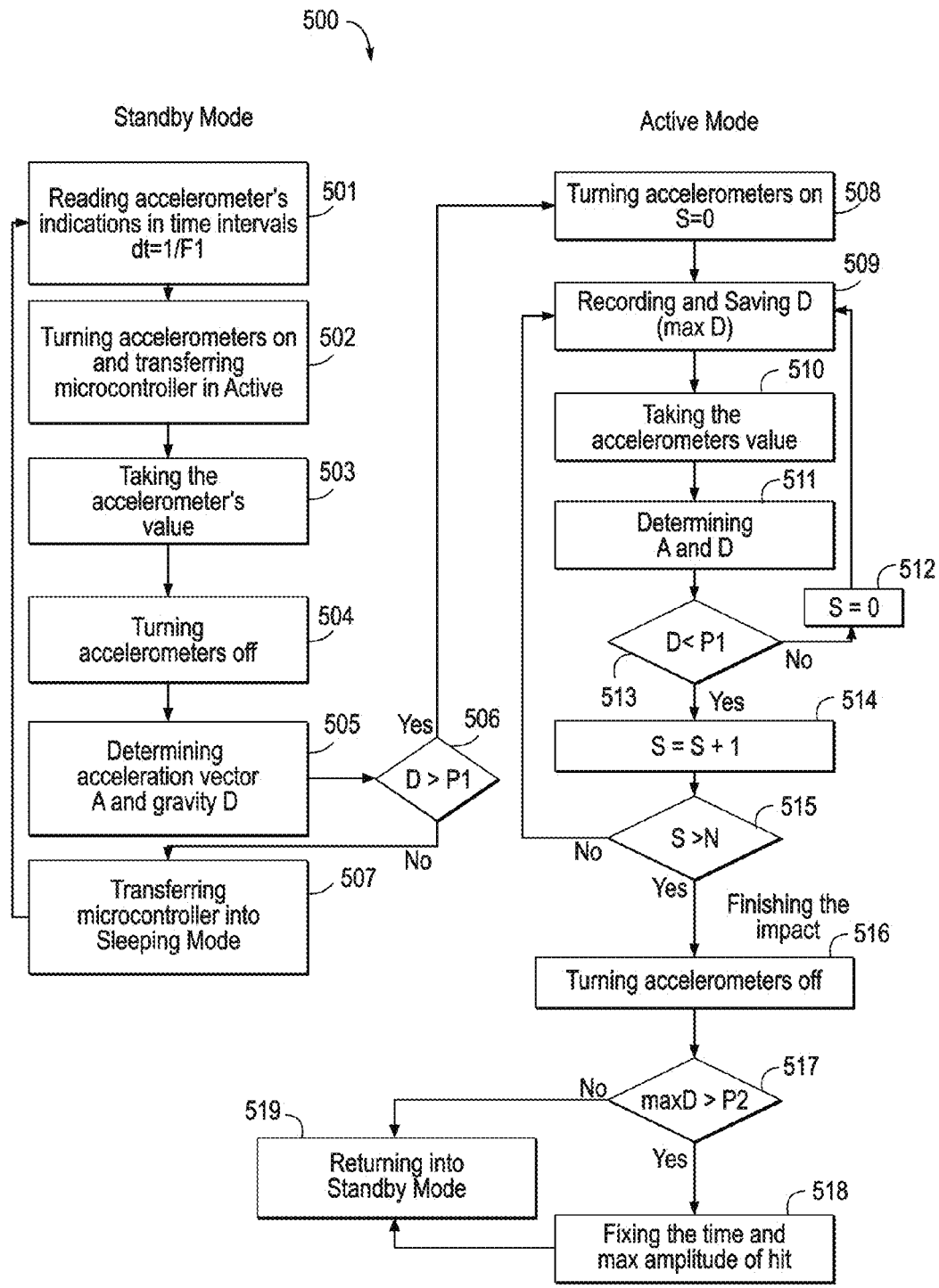
FIG. 5 is a flowchart of method for detecting and registering a container intrusion signal by accelerometer.

FIG. 5 illustrates a flowchart of method for detecting and registering a container intrusion signal by accelerometer. In order to save CSD power, accelerometer indications are monitored in two modes: Standby and Active. In Standby mode, the accelerometers are checked in equal time periods with frequency F1 about 100 Hz, instead of constant monitoring. Sensors go offline between checkpoints, and the module's microcontroller, if not being used, enters sleep mode.

In Standby, the accelerometer's 310C indications are read in time intervals dT=1/F1 in Step 501. Then, the accelerometer 310C is turned on, and the microcontroller 330 is in Active mode at 502. Then the accelerometer's values are taken at 503. At 504, the accelerometer 310C is turned off. Based on values obtained, an absolute value of apparent acceleration vector $A=\sqrt{A_X^2+A_Y^2+A_Z^2}$ and its deviation from gravity vector, D=A−1, are determined at 505. If D does not exceed preset threshold P1 shown at 506, the CSD 140 remains in Standby at 507, otherwise it enters Active mode of accelerometer indications monitoring. P1 should be ~0.5 g.

In Active mode, the accelerometers remain online from the moment of Active mode entry shown at 508 to the moment when the gravity vector D remains below threshold P1 shown at 513 for N measurement cycles as shown at 514 and 515. When S (number of cycles when gravity vector D is less then P1) exceeds N, then this in itself is the condition for exiting the Active mode as shown at 516, then the accelerometers 301C are turned off. The gravity vector D is measured and determined in each measurement cycle shown at 510 and 511 and its maximum value maxD is recorded as shown at 509. MaxD is verified upon exiting the Active mode. If the value MaxD exceeds threshold P2 as shown at 517, the majority algorithm of the integrated sensor processing procedure 470 indicates an impact against the container's structure and time and amplitude of hit have fixed values as shown at 518. If, however, the value MaxD does not exceed the threshold P2, then the microcontroller returns into the Standby mode as shown at 519.

Figure 6:
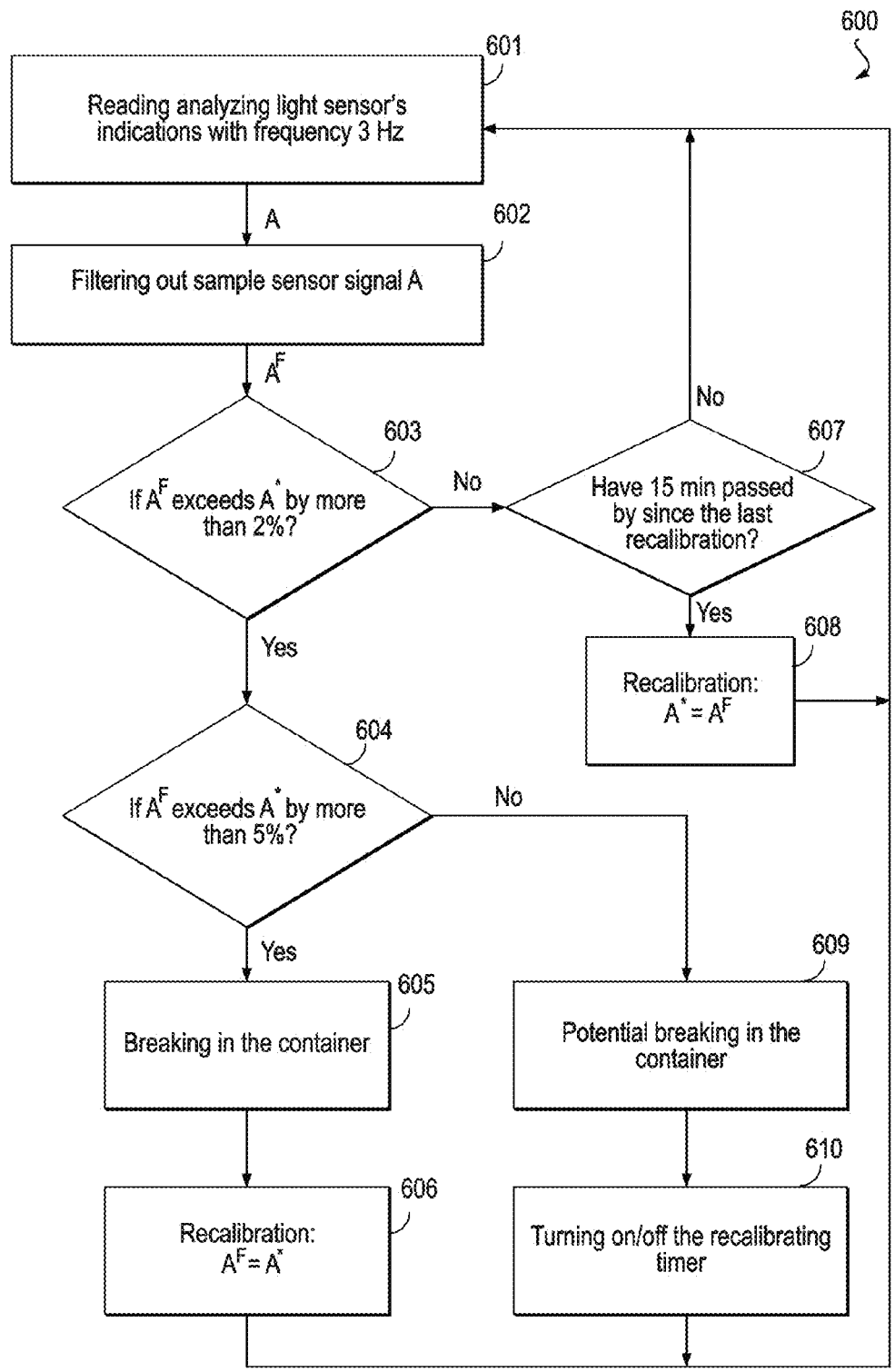
FIG. 6 is a flowchart of method for detecting and registering a container intrusion signal by a light sensor.

FIG. 6 is an exemplary flowchart illustrating an embodiment of a method for detecting and registering a container intrusion signal by a light sensor. The algorithm is used to determine breaking in the container by a change in light intensity inside the container as the result of both penetration of outside light and light flashes occurring in metal cutting tools operation.

The indications of the light sensor 310A (shown in FIG. 6) are read and analyzed with frequency about 3 Hz as shown at 601. A sampled sensor signal A is filtered out, and errors due to random deviations of sensor indications are eliminated as shown at 602. Filtered signal $A^F$ is compared in two stages with original sensor readings. If the filtered signal $A^F$ exceeds a predetermined signal A* by more than 2% as show at 603, the integrated sensor procedure 470 reports potential breaking in the container as show at 609. If the filtered signal $A^F$ exceeds the predetermined signal A* by more than 5% as shown at 604, the integrated sensor procedure 470 reports the break in the container 130 as shown at 605. However, if the filtered signal $A^F$ does not exceed the predetermined signal A* by more than 5% as shown at 604, the integrated sensor processing procedure 470 reports high chance of breaking in the container as show at 609. Light sensor is recalibrated every fifteen minutes in the process of its monitoring as show at 606, 607, 608 and 610. Recalibration is required because containers are not hermetically sealed, due to which light intensity inside of them could change in changing outside light conditions (at day/night).

Figure 7:
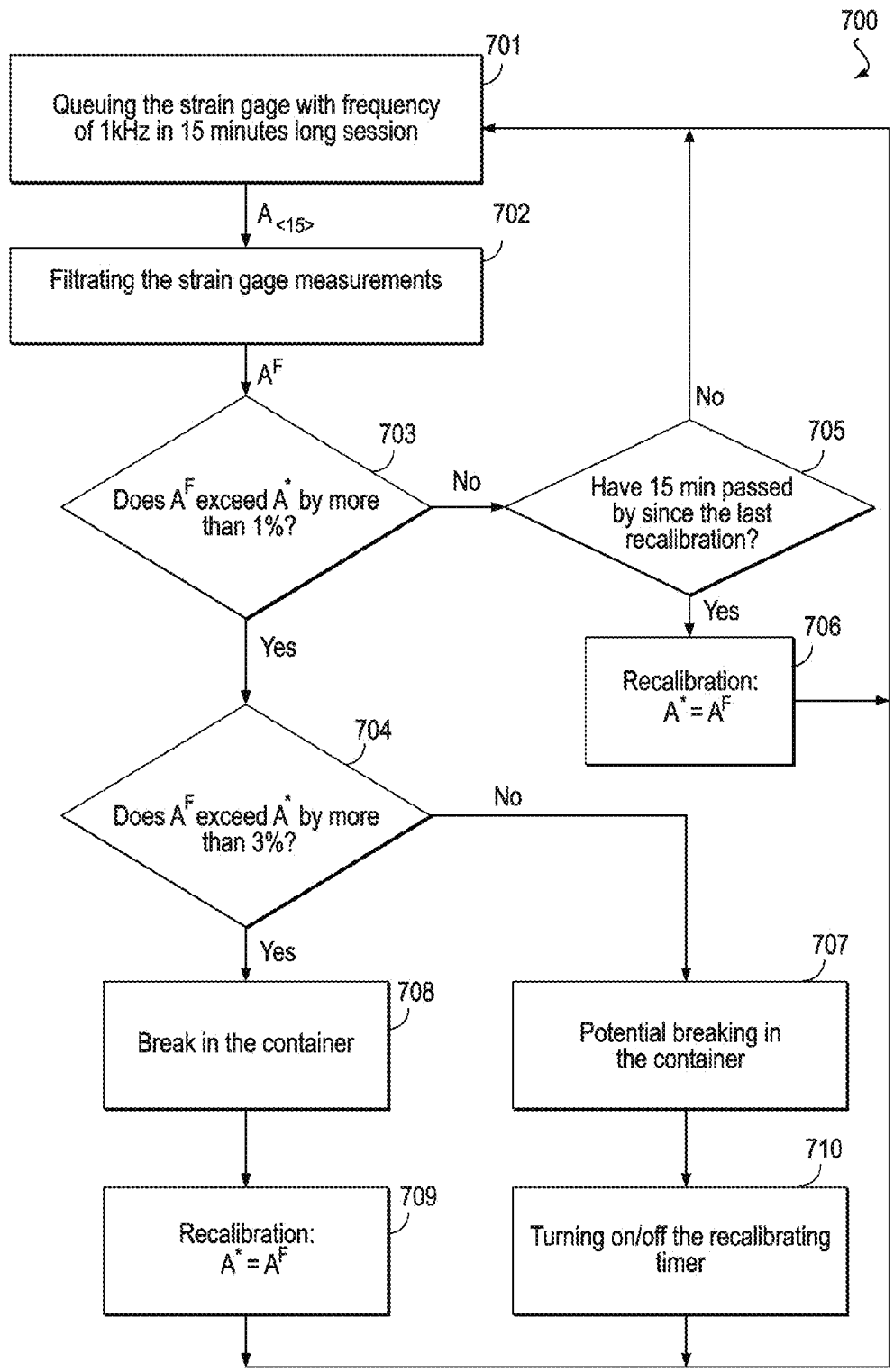
FIG. 7 is a flowchart of method for detecting and registering a container intrusion signal by a strain gage.

FIG. 7 is an exemplary flowchart illustrating an embodiment of a method for detecting and registering a container intrusion signal by a strain gage. The algorithm is used to record damage (alterations) to container structure.

The strain gage 310G is queued with frequency about 1 kHz in 15 ms-long sessions shown at 701. Vector of measured results $A_{<15>}$ is median filtered to form a filtered signal $A^F$ as shown at 702. Measurement sessions occur with frequency about 3 Hz. The filtered signal $A^F$ is compared in two stages with original sensor readings A*. If the filtered signal $A^F$ exceeds original sensor readings A* by more than 1% as show at 703, the integrated sensor processing procedure 470 reports potential damage to container structure as shown at 707. If the filtered signal $A^F$ exceeds original sensor readings A* by more than 3% as shown at 704, the integrated sensor processing procedure 470 reports the break in the container 130 as shown at 708. However, if the filtered signal $A^F$ does not exceed original sensor readings A* by more than 3% as shown at 704, the integrated sensor processing procedure 470 reports potential damage to container structure as shown at 707. Strain gage is recalibrated hourly in the process of its monitoring as shown at 705, 706, 709 and 710. This is required because changing ambient temperature (at day/night) causes strain of metal container walls.

Figure 8:
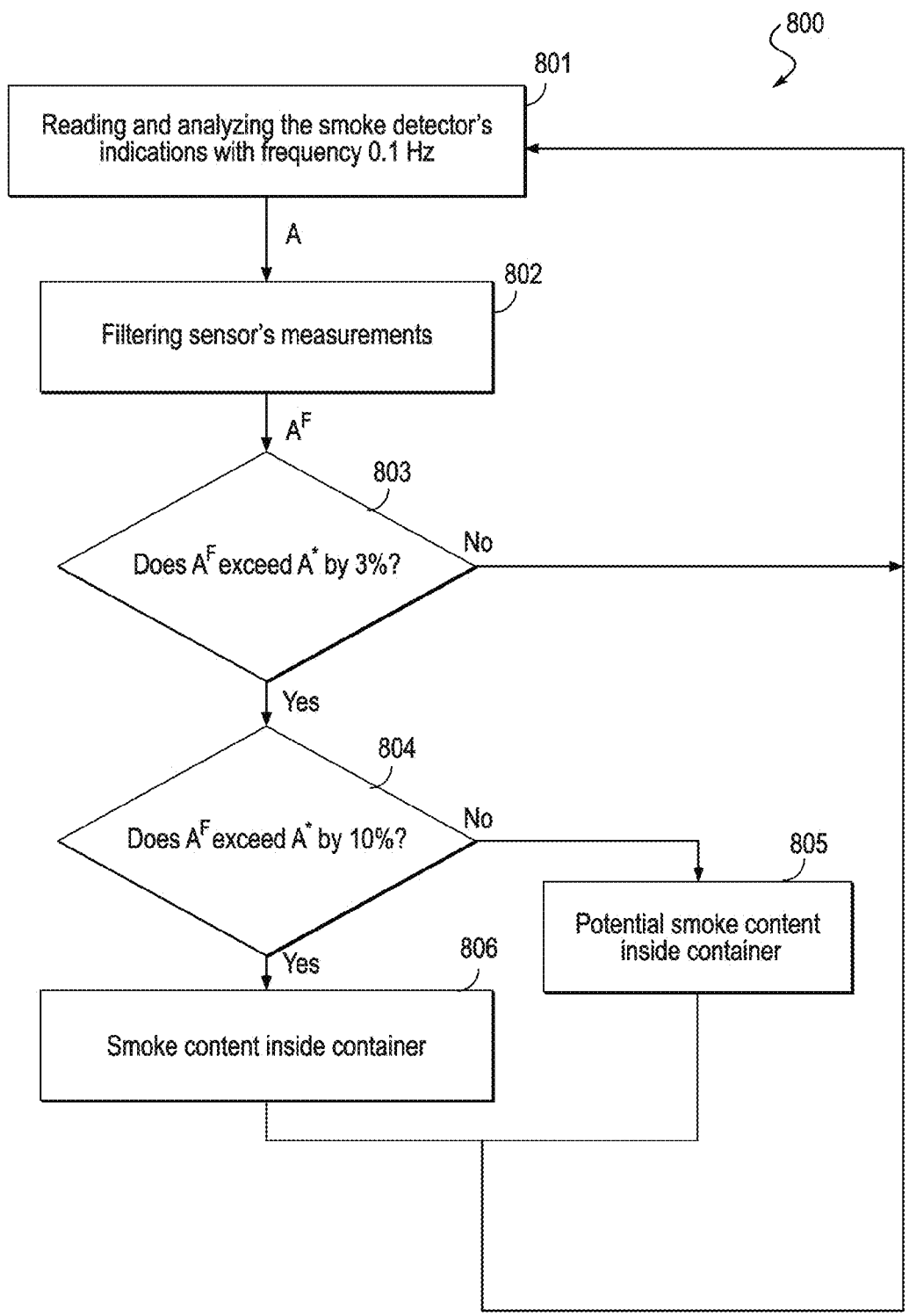
FIG. 8 is a flowchart of method for detecting and registering a container intrusion signal by a smoke detector.

FIG. 8 is an exemplary flowchart illustrating an embodiment of a method for detecting and registering a container intrusion by a smoke detector sensor. The algorithm is used to determine smoke content in the container due to fire or breaking in using metal cutting instruments.

The indications of smoke detector sensor 310N (shown in FIG. 8) are read and analyzed with frequency about 0.1 Hz shown at 801. Sampled sensor signal A is filtered out and errors due to random deviations of sensor indications are eliminated as shown at 802. Filtered signal $A^F$ is compared in two stages with original sensor readings A*. If the filtered signal $A^F$ exceeds original sensor readings A* by more than 3% shown at 803, the integrated sensor processing procedure 470 reports potential smoke content inside the container shown at 805. If the filtered signal $A^F$ exceeds original sensor readings A* by more than 10%, the integrated sensor processing procedure reports smoke content inside the container as shown at 806. However, if the filtered signal $A^F$ does not exceed original sensor readings A* by more than 10%, the integrated sensor processing procedure 470 reports potential smoke content inside the container as shown at 805. The some detector sensor 310N is calibrated once during activation of security module.

Figure 9:
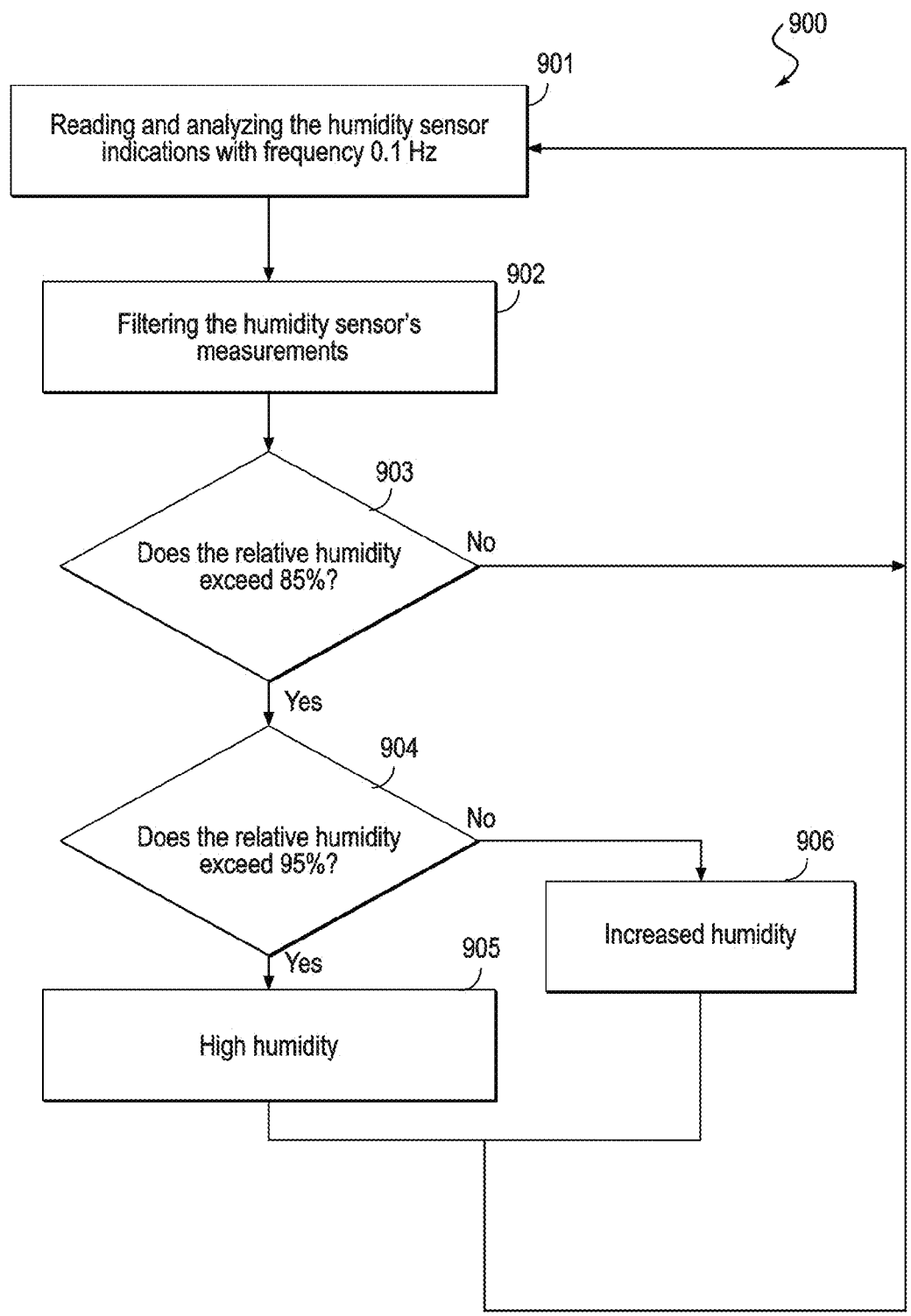
FIG. 9 is a flowchart of method for detecting and registering a container intrusion signal by a humidity sensor.

FIG. 9 is an exemplary flowchart illustrating an embodiment of a method for detecting and registering a container intrusion signal by a humidity sensor. The algorithm is used to record relative humidity inside the container.

The indications of humidity sensor 310N (shown in FIG. 9) are read and analyzed with frequency about 0.1 Hz as shown at Step 901. Sampled sensor signal is filtered out and errors due to random deviations of sensor indications are eliminated as shown at 902. Filtered signal passes two-stage evaluation. If relative humidity exceeds 85% as shown at 903, the integrated sensor processing procedure 470 reports increased humidity inside the container as shown at 906. If relative humidity exceeds 95% as shown at 904, the integrated sensor processing procedure reports high humidity inside the container as shown at 905. However, if relative humidity does not exceed 95% as shown at 904, the integrated sensor processing procedure 470 reports increased humidity inside the container as shown at 906.

Figure 10:
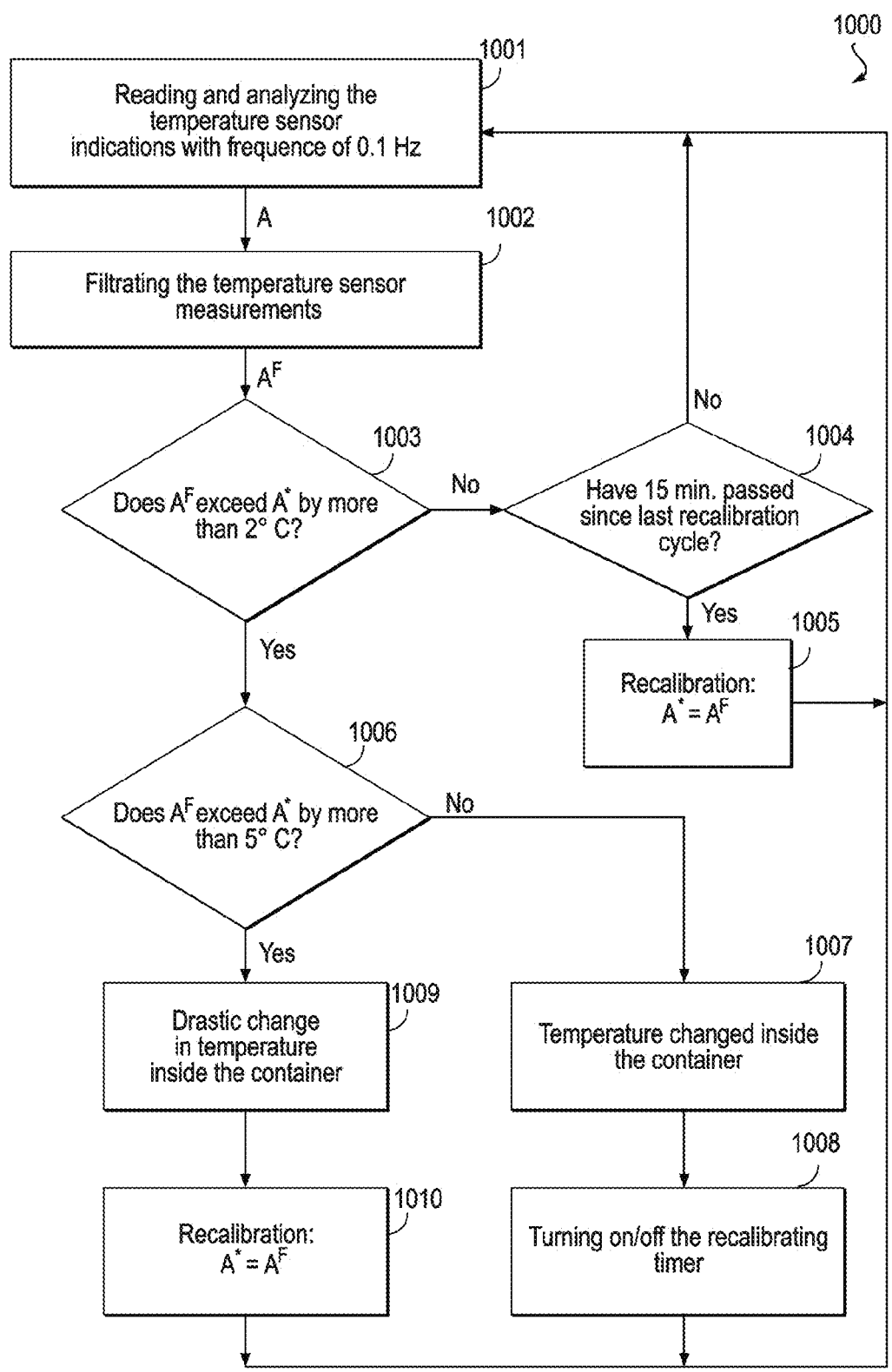
FIG. 10 is a flowchart of method for detecting and registering a container intrusion signal by a temperature sensor.

FIG. 10 is an exemplary flowchart illustrating an embodiment of a method for detecting and registering a container intrusion signal by a temperature sensor. Aside from recording the temperature inside the container in order to manage cargo storage conditions, the algorithm is able to monitor the rate of temperature change.

The indications of the temperature sensor 310N (shown in FIG. 10) are read and analyzed with frequency about 0.3 Hz as shown at 1001. Sampled sensor signal A is filtered out and errors due to random deviations of sensor indications are eliminated as shown at 1002. Filtered signal $A^F$ is compared in two stages with original sensor readings A*. If the filtered signal $A^F$ exceeds original sensor readings A* by more than 2° C. as shown at 1003, the integrated sensor processing procedure 470 reports temperature change inside the containers as shown at 1007. If the filtered signal $A^F$ exceeds original sensor readings A* by more than 5° C. as shown at 1006, the integrated signal processing procedure 470 reports drastic change of temperature inside the container as shown at 1009. However, if the filtered signal $A^F$ does not exceed original sensor readings A* by more than 5° C. as shown at 1006, the integrated sensor processing procedure 470 reports temperature change inside the containers as shown at 1007. Temperature sensor is recalibrated every fifteen minutes in the process of its monitoring as shown at 1004, 1005, 1008 and 1110. Recalibration is required because containers heat up and cool down in a broad temperature range during day/night cycle.

Figure 11:
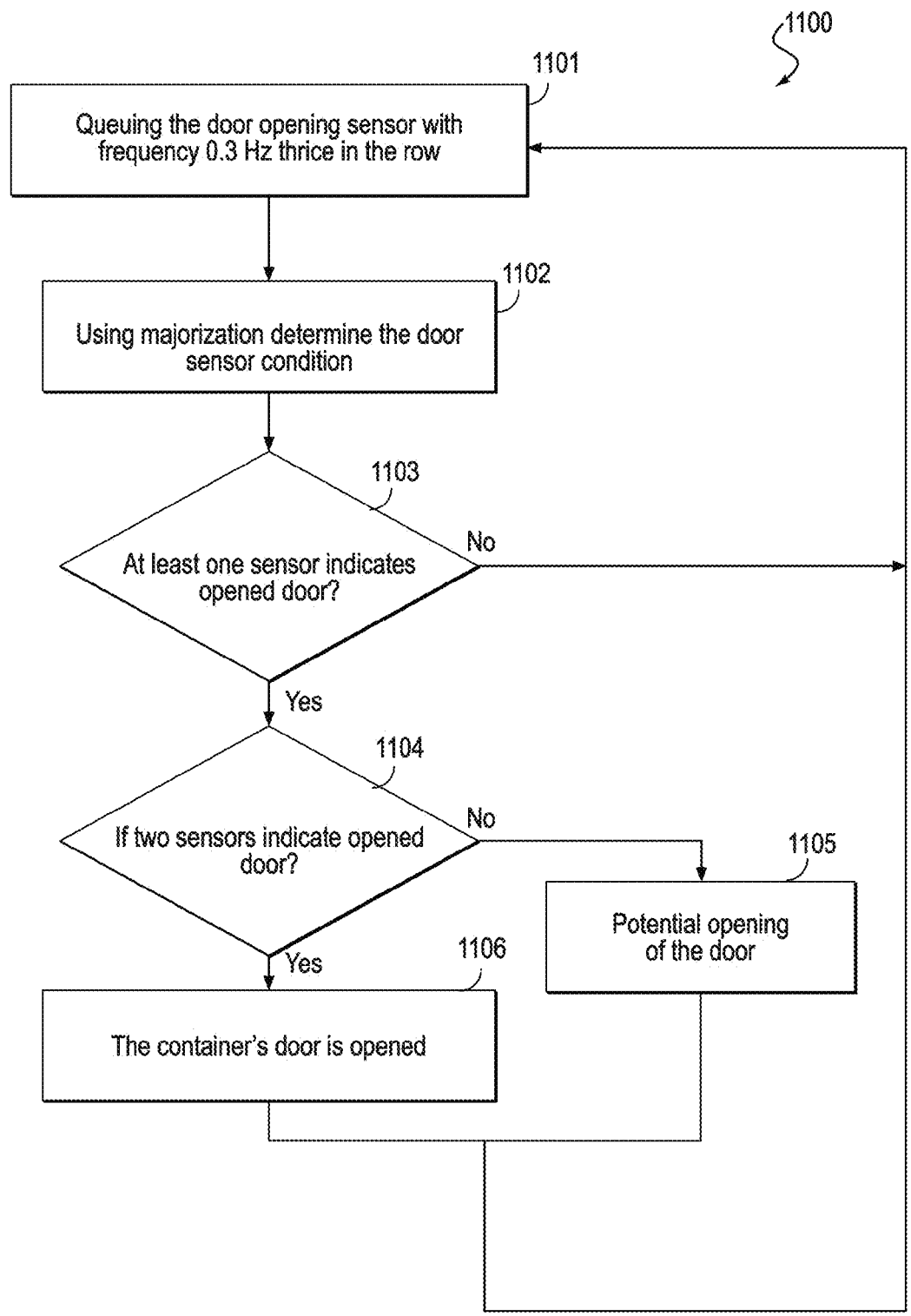
FIG. 11 is a flowchart of method for detecting and registering a container intrusion signal by a door-opening sensor.

FIG. 11 is an exemplary flowchart illustrating an embodiment of a method for detecting and registering a container intrusion signal by an incremental door opening sensors. In order to obtain more reliable judgment, two sensors are installed per container door.

The door opening sensors 310L are queued with frequency 0.3 Hz. In order to eliminate random errors, each sensor is queued thrice as shown at 1101, after which each sensor's condition is determined using majorization as part of the integrated sensor processing procedure 470 as shown at 1102. Based on obtained values, a judgment is drawn about condition of each container door as shown at 1103. If both sensors indicate closed door as shown at 1104, the door is reported to be closed. If both sensors indicate opened door as shown at 1104, the door is reported to be opened as shown at 1106. If sensor indications are inconsistent, sensor signal processing procedure reports potential opening of the door as shown at 1105.

Figure 12:
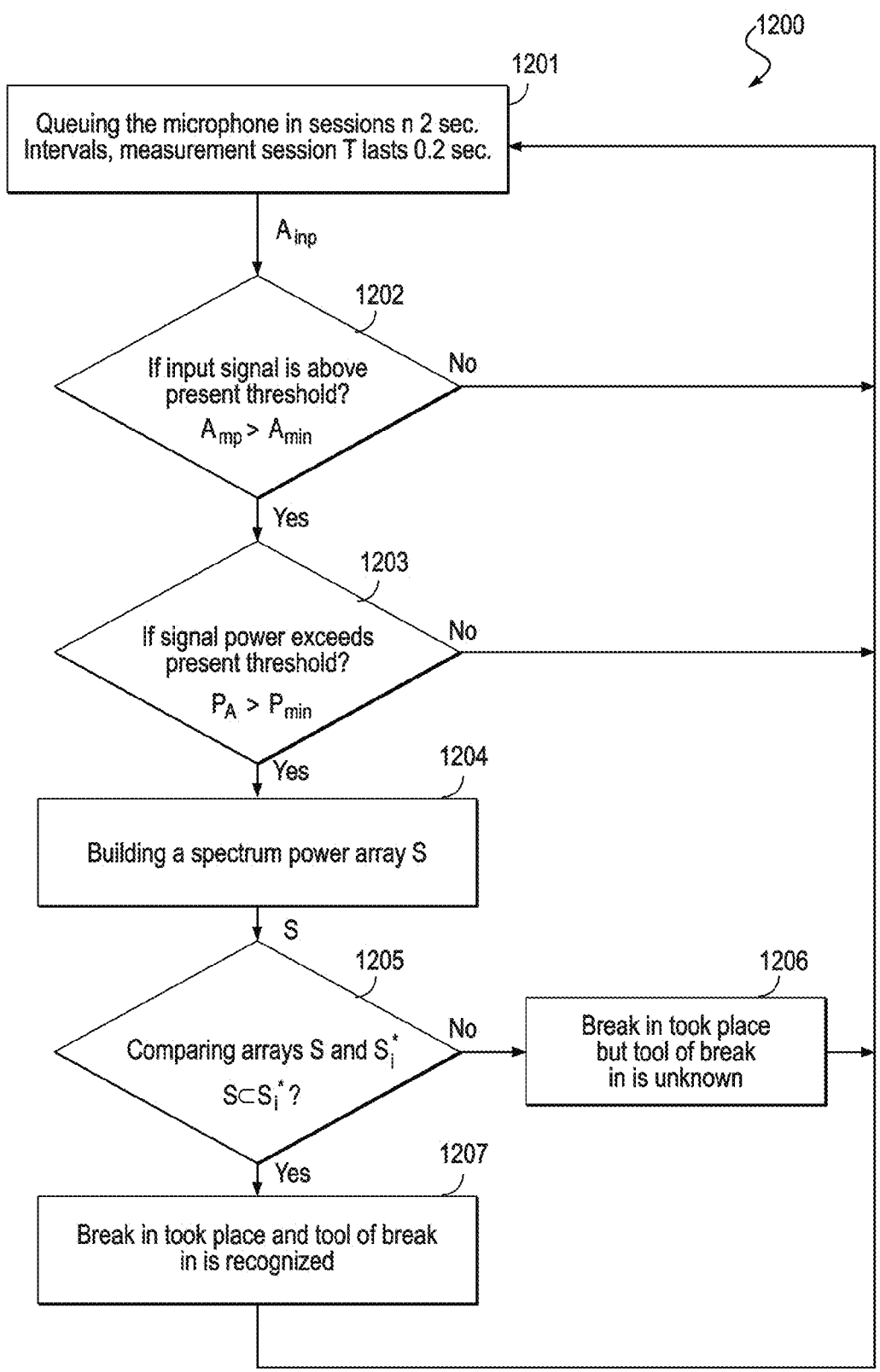
FIG. 12 is a flowchart of method for detecting and registering a container intrusion signal by a microphone.

FIG. 12 is an exemplary flowchart illustrating an embodiment of a method for detecting and registering a container intrusion signal by a microphone, which enables the CSD 140 to record noise caused by container breaking tools, and to determine possible type of tool.

The microphone 310P is queued in sessions in two second intervals. This saves the CSD 140 power while avoiding the danger of missing the noise of tools' operation. Measurement session T lasts 0.2 seconds as shown at 1201. At the first level of examination, amplitude of microphone signal is verified across the entire frequency band. If input signal $A_{inp}$ is below preset threshold $A_{min}$ as shown at 1202, subsequent signal processing is skipped until next measurement cycle as shown at 1201. Otherwise, power of received signal $$P_A = \frac{1}{T} \int_T A_{inp}^2 \, dt \qquad \text{(Equation 1)}$$

is evaluated. The power of the received signal can be calculated in accordance with Equation 1. If signal power exceeds preset threshold $P_A > P_{min}$ judgment is drawn about presence of noise correspondent to breaking in the container as shown at 1203. A second level of processing then takes place, which includes a spectrum analysis of the signal power in order to determine the type of tool used to break in the container as show at 1205. In this connection, bands exhibiting signal amplitude above preset thresholds $A_{inp}{}^f > A_{min}{}^f$ are gated out across the entire frequency range. Spectrum power of sound $$P_f = \frac{1}{T \Delta F} \int_{\Delta F} \int_T A_{inp}^2 \, dt \, df \qquad \text{(Equation 2)}$$

is calculated for gated bandwidth $\Delta F$. The spectrum power of sound can be calculated in accordance with Equation 2. Through signal processing, a spectrum power array at different frequency bands S is generated. Each container-breaking tool is characterized by its own array of sound spectrum power $S_i^*$, limited from below. Tool of breaking is determined in comparing arrays S and $S_i^*$. If array S is included in an array of sound spectrum power $S_i$ as shown at 1205, then breaking took place and the tool used for breaking is recognized as shown at 1207. However, if array S is not included in an array of sound spectrum power $S_i$ as shown at 1205, then breaking took place but the tool used for breaking is unknown as shown at 1206.

Figure 13:
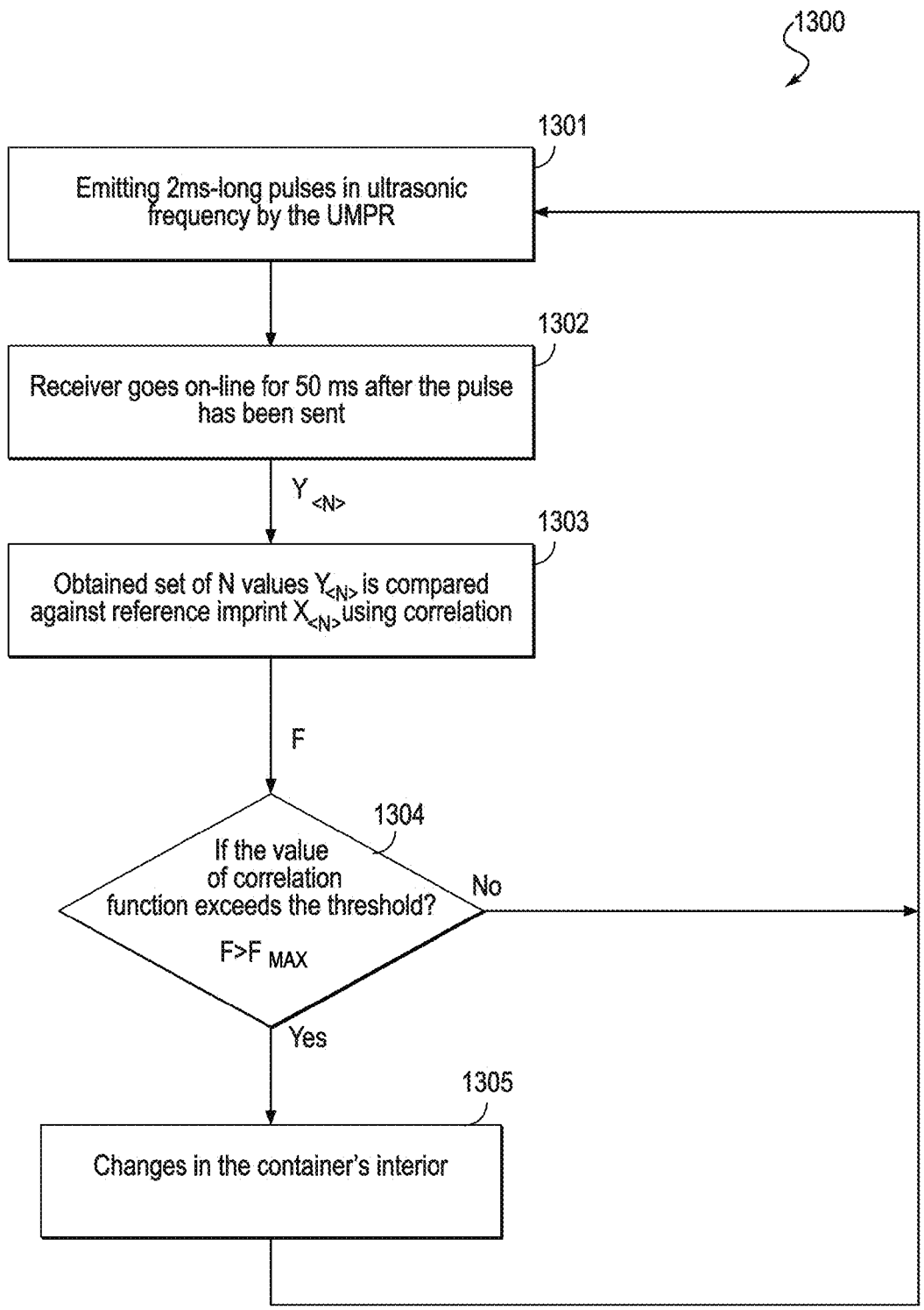
FIG. 13 is a flowchart of method for detecting and registering a container intrusion signal by a UMPR.

FIG. 13 is an exemplary flowchart illustrating an embodiment of a method for detecting and registering a container intrusion signal based on UMPR 310J. The UMPR 310J enables the system to construct a unique digital imprint of the container interior, representing arrangement of items within radar coverage. The imprint may correspond to changes in arrangement of interior items.

To obtain the imprint, the UMPR 310J emits 2 ms-long pulses in ultrasonic frequency, such as 40 kHz, as shown at 1301. Meanwhile, the UMPR 310J receiver stays idle. Emitted signal reflects repeatedly from container interior items and then returns to the UMPR 310J, where it is received by ultrasonic receiver. Receiver goes online for 50 ms after the pulse has been sent as shown at 1302. Changes in amplitude of received signal for this period are the imprint of container interior.

To compare the obtained imprint against the referenced one (which was obtained at the beginning of the trip and stored in the pulling library of images 425), UMPR 310J receiver signal is sampled with at least double frequency of emitted signal. An obtained set of N values $Y_{<N>}$, is compared against reference imprint $X_{<N>}$ using correlation functions as shown at 1303. For example, a function could be used based on a supposition that the actual imprint could be represented on the reference basis using correlation factors A and B and expressed as $Y_1 = AX_1 + B$. Correlation factors are derived from the system of equations $$A = \frac{\sum_{i=1}^{N} x_i \cdot \sum_{i=1}^{N} y_i - N \cdot \sum_{i=1}^{N} x_i \cdot y_i}{\left(\sum_{i=1}^{N} x_i\right)^2 - N \cdot \sum_{i=1}^{N} x_i^2}; \qquad \text{(Equation 3)}$$

$$B = \frac{1}{N} \cdot \left(\sum_{i=1}^{N} y_i - A \cdot \sum_{i=1}^{N} x_i\right) \cdot Va \qquad \text{(Equation 4)}$$

The correlation factor A can be calculated in accordance with Equation 3. And the correlation factor B can be calculated in accordance with Equation 4. The value of correlation function formulated using least-squares method $$F = \sum_{i=1}^{N} (y_i - Ax_i - B)^2 \qquad \text{(Equation 5)}$$

is compared against the limit $F_{MAX}$, and if the limit is exceeded as shown at 1304, a judgment is drawn about changes in container interior as shown at 1305. The value of correlation function can be calculated in accordance with Equation 5.

Figure 14:
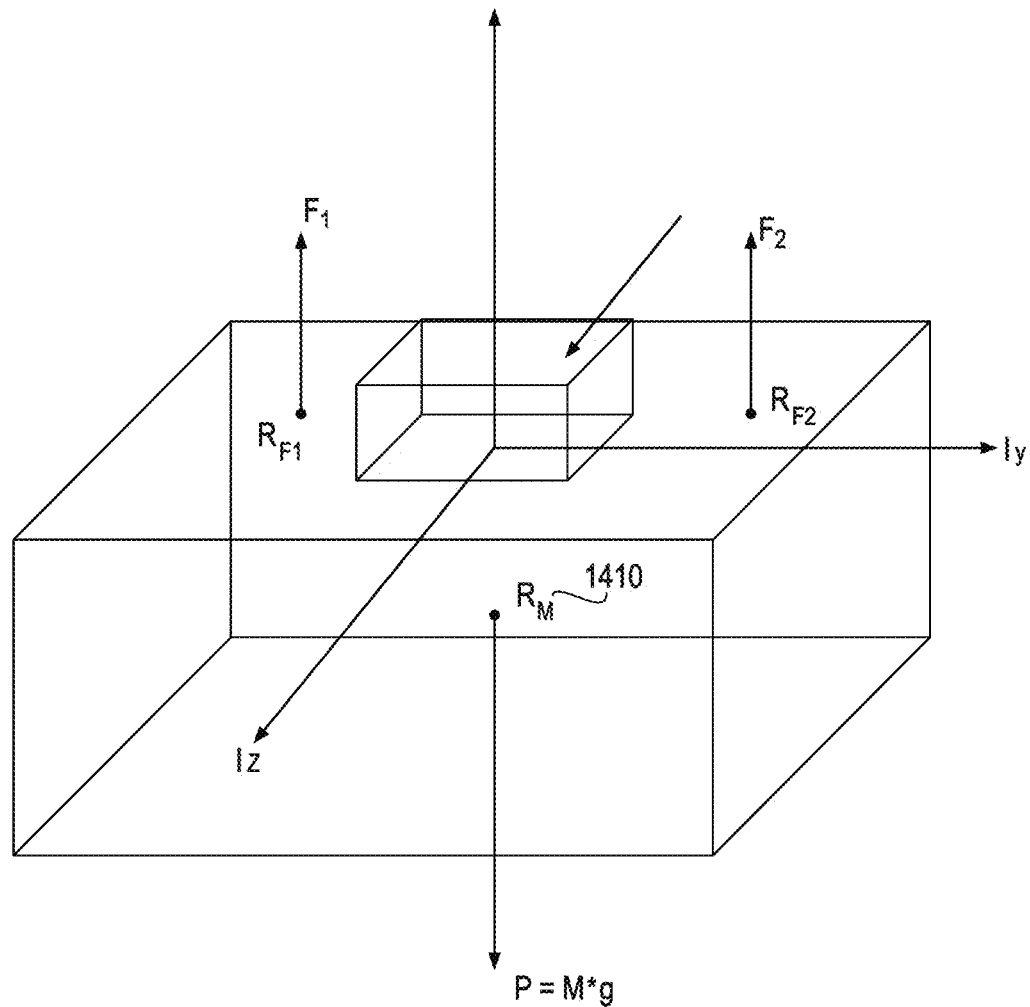
FIG. 14 is a schematic diagram illustrating exemplary parameters for measuring a digital signature.

In one embodiment, the accelerometers 310C, as shown in FIG. 3, are included within CSD 140 and are used to create a digital signature (DS) and may be used to identify location of cargo within the container 130. FIG. 14 is a schematic diagram illustrating exemplary parameters that may be used to form the digital signature DS. As illustrated in FIG. 14, the following parameters characterize a spatial distribution of the container 130: M is the mass of the cargo; $R_M$ represents the coordinates of the center of mass within the body frame, which is strictly connected with the container itself; and Ix, Iy, and Iz are components of the container moment of inertia, which characterize the mass distribution with respect to the center of mass.

These parameters may be used to define the digital signature DS and may further be used to define the expected motion of the container 130. Changes in one or more of these measured parameters may, therefore, correspond to certain events during cargo transportation. For example, if the digital signature DS has not changed, the cargo is intact. If M and Ix, Iy, and Iz are the same but $R_M$ has changed, the cargo may not be stolen or damaged but may have moved within the container 130 (i.e., the coordinates of the center of mass $R_M$ change as the cargo moves within the container 130). It may, therefore, be necessary to check fastenings of the cargo within the container 130. If, for example, parameter M does not change, but parameters Ix, Iy, and Iz and $R_M$ have changed, it is probable that the cargo has not been stolen. The status of the cargo can be precisely determined based on the degree of change of the parameters. However, it is also possible that a partial destruction of the cargo took place (e.g., damage resulting from inaccurate unloading). Change of the moment of inertia with respect to the center of mass may occur due to this destruction. If all parameters of the digital signature DS have changed, it is likely that the container has been tampered with. In one embodiment, the determination of the digital signature DS allows one to reveal theft without opening the container. The determination of the digital signature DS may also provide continuous monitoring of the cargo's condition.

Figure 15:
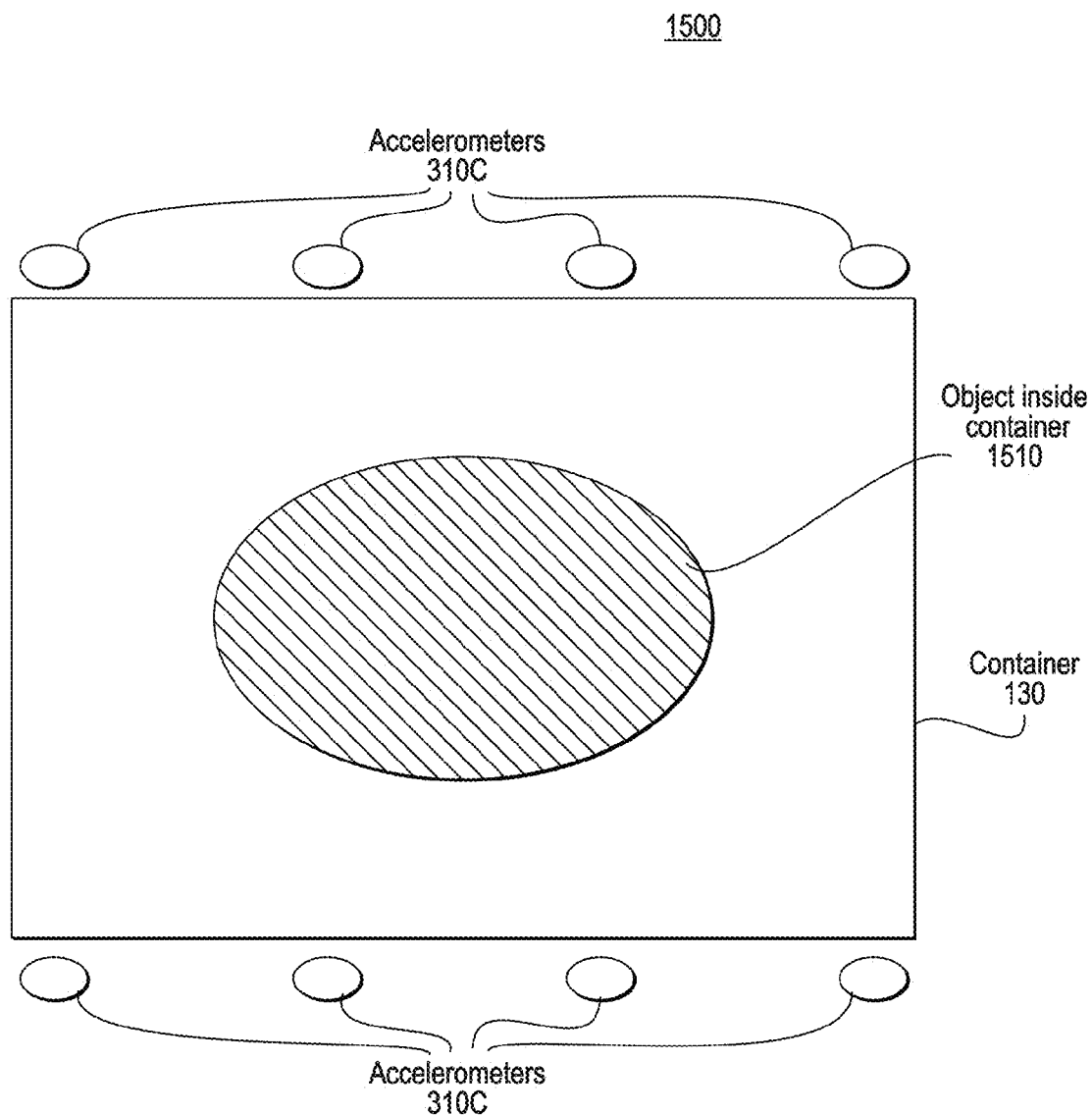
FIG. 15 shows a cross-sectional view of one exemplary Mass-tomograph in accordance with one embodiment.

In one embodiment, the accelerometers 310C (shown in FIG. 3) that are included within the CSD 140 form a Mass-tomograph 1500 as shown in FIG. 15. The plurality of accelerometers 310C that form the Mass-tomograph is coupled to walls of the container 130. The Mass-tomograph 1500 is used to construct a spatial picture of mass distribution within the container 130. In particular, FIG. 15 shows a cross-sectional view of one exemplary Mass-tomograph 1500 in accordance with one embodiment. Mass-tomograph 1500 may, for example, be used to subtract effects of the surroundings on the accelerometers measurements. The initial calibration of accelerometers may occur without any cargo in the container 130. A second round of measurements may occur when an object or a cargo is placed inside the container 130. The calibration measurements of the accelerometers 310C are subtracted from the second round of measurements to eliminate influence of the container itself, and the accelerometer measurements are thus only determined for the mass of the object 1510.

Figure 16:
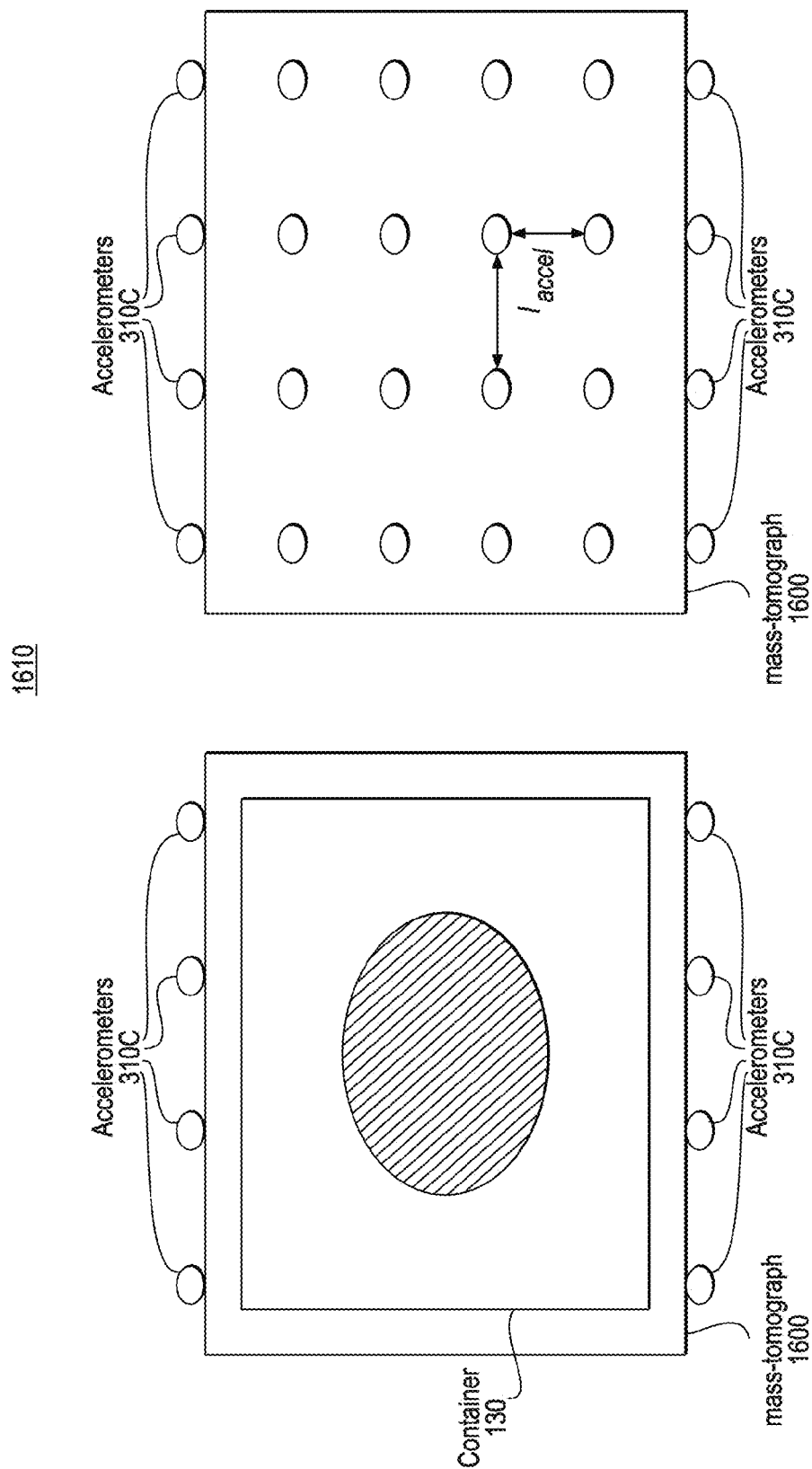
FIG. 16 shows a cross-sectional view of the Mass-tomograph depicted in FIG. 15 when the container is steady.

FIG. 16 is an exemplary cross-sectional view illustrating an embodiment of Mass-tomograph 1600 that is external to container 130 when the container 130 is in non-moving position. In this embodiment, the Mass-tomograph is used as a device to obtain imaging of the contents of the container 130. In this example, the mass-tomograph 1600 monitors the whole container 130. When the container 130 is in the non-moving position, the quality of the spatial mass distribution of the container mass depends on two parameters: the accuracy of accelerometers; and the distance, $I_{accel}$ 1620, between adjacent accelerometers 310C that form the Mass-tomograph 1600.

Figure 17:
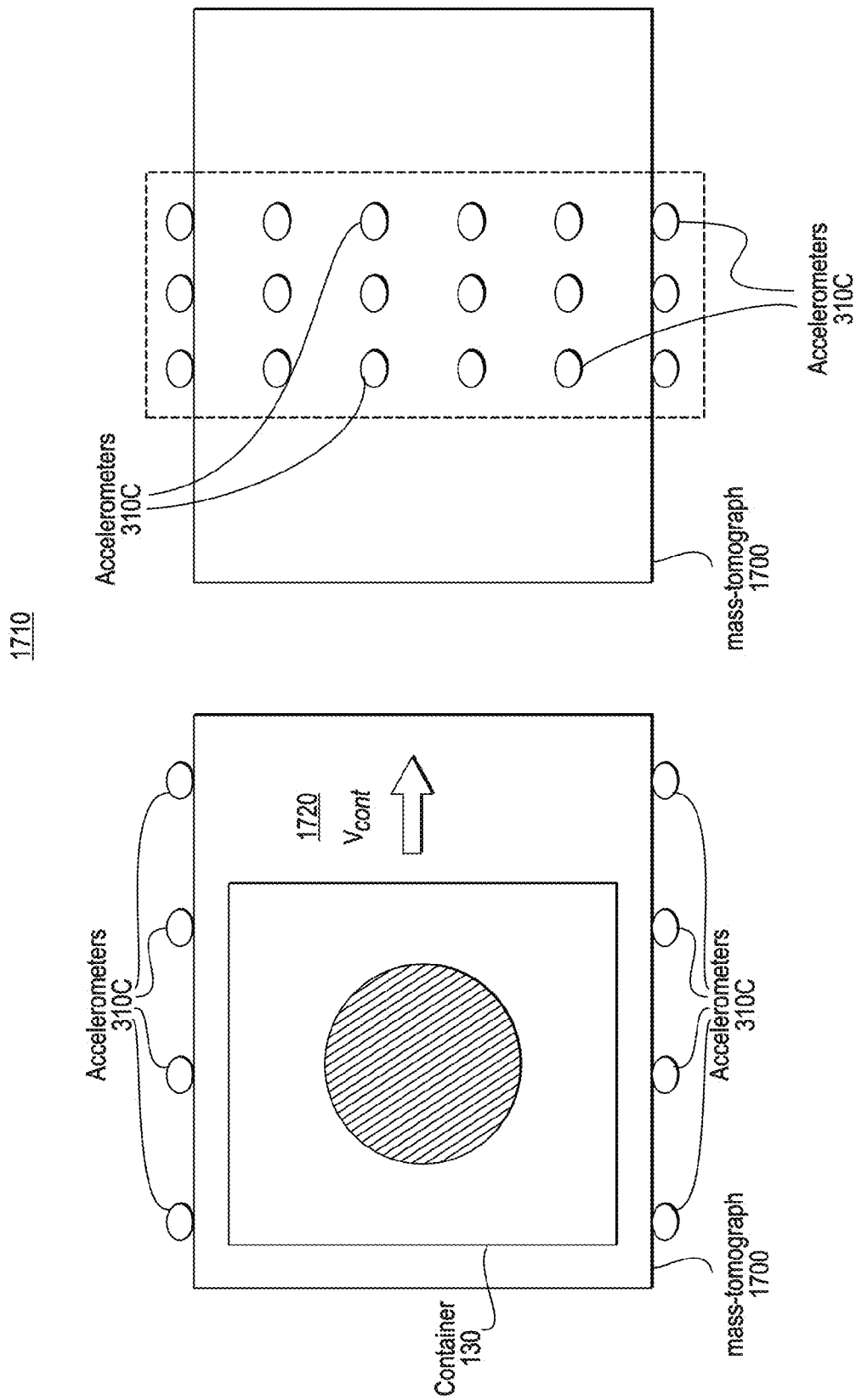
FIG. 17 shows a cross-sectional view of the Mass-tomograph depicted in FIG. 15 when the container is moving.

FIG. 17 is an exemplary cross-sectional view illustrated an embodiment of Mass-tomograph 1700 when the container 130 is moving. Mass-tomograph 1700 may, for example, represent the Mass-tomograph 1600 of FIG. 16. In this example, the Mass-tomograph 1700 scans the container 130 as the container 130 moves gradually through the Mass-tomograph 1700; in this example, the container 130 moves with a steady speed $V_{cont}$ 1720. In this example, a high quality spatial mass distribution inside the container 130 may be determined. Since the quality of spatial mass distribution depends only on the accuracy of accelerometers, the perceived distance $I_{accel}$ 1620 between adjacent accelerometers will be minimal due to the movement of the container 130.

Figure 26:
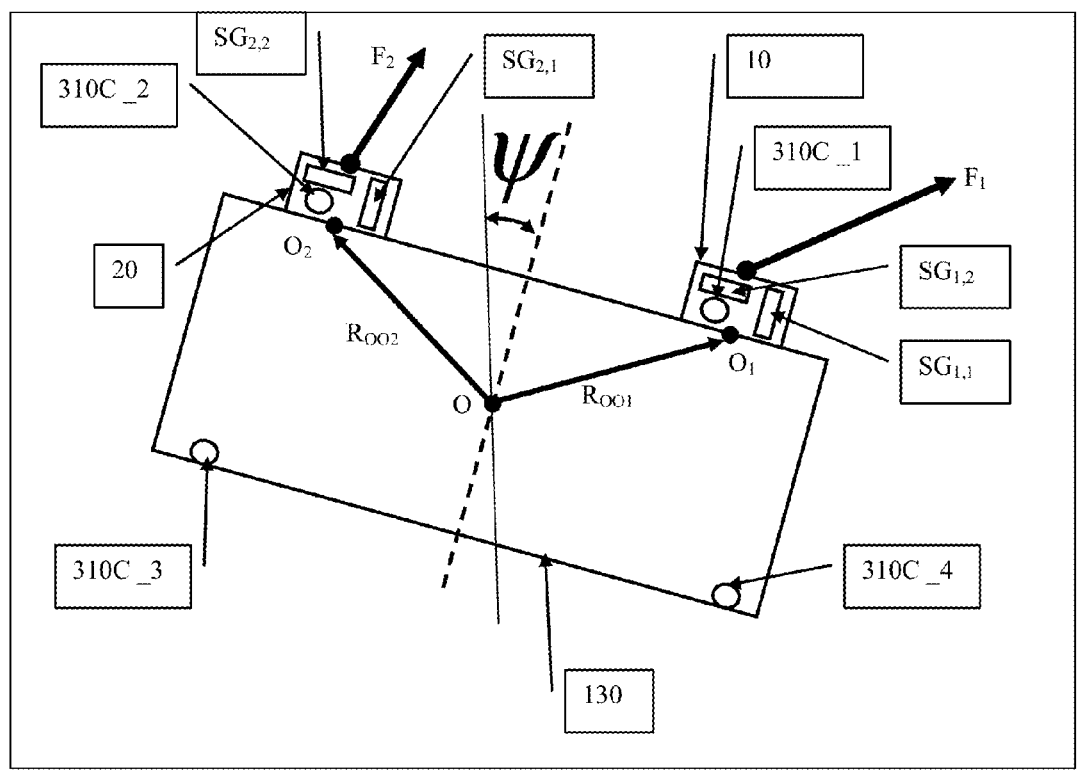
FIG. 26 is an exemplary detail drawing illustrating a perspective view of an embodiment of a cargo container, wherein a plurality of accelerometers and a plurality of strain gages are positioned on the cargo container for determining the moment of inertia of the cargo container.

In one embodiment, the moment of inertia of the container 130 can be used as a digital signature. FIG. 26 is an exemplary schematic diagram illustrating an embodiment of a method to determine the moment of inertia of the container 130 to be used as digital signature DS. As illustrated in FIG. 26, the container 130 is schematically shown as having lifting lugs 10 and 20. Accelerometers 310C_1, 310C_2, 310C_3, 310C_4 and strain gages $SG_{1,1}$, $SG_{2,1}$, $SG_{1,2}$, $SG_{2,2}$ are shown as being distributed over the container 130. In the embodiment of FIG. 26, accelerometer 310C_1 and strain gages $SG_{1,1}$, $SG_{1,2}$ are incorporated in the lifting lug 10 of the container 130, accelerometer 310C_2 and strain gages $SG_{2,1}$, $SG_{2,2}$ are incorporated in the lifting lug 20 of the container, accelerometer 310C_3 is positioned at a location within CSD 140 (not shown in FIG. 26), and accelerometer 310C_4 is positioned at a location within the container at a point spaced from the accelerometer 310C_3. According to one embodiment, the accelerometers 310C_3 and 310C_4 are spaced apart by a substantial distance to increase the precision of measurements. Strain gages $SG_{1,1}$, $SG_{2,1}$ measure vertical components of forces $\vec{F}_1$, $\vec{F}_2$, respectively, while strain gages $SG_{1,2}$, $SG_{2,2}$ measure horizontal components of forces $\vec{F}_1$, $\vec{F}_2$, respectively.

As further illustrated in FIG. 26, point O is the container mass center and points $O_1$, $O_2$ are connection points of lifting lugs 10, 20, respectively, to the container.

According to one embodiment, the container moment of inertia/can be determined in accordance with the following equation:

$$I = \frac{\vec{F}_1 \times \vec{R}_{OO1} + \vec{F}_2 \times \vec{R}_{OO2}}{\psi''},$$

where components $\vec{F}_1$, $\vec{R}_{OO1}$, $\vec{F}_2$, $\vec{R}_{OO2}$, $\psi''$ are defined in a stationary system of coordinates and have the following meanings:

$\vec{F}_1$, $\vec{F}_2$ are forces applied to the lifting lugs 10, 20, respectively;

$R_{OO1}$, $R_{OO2}$ are radius vectors from the container mass center O to the connection points $O_1$, $O_2$; and $\psi$ is the angle of inclination from the balanced (horizontal) position of the loaded container (as shown in FIG. 26).

In one embodiment, the following steps can be taken to define the parameters for determining the container moment of inertia/used as digital signature:

(a) Calculating $\vec{F}_1$, $\vec{F}_2$ in a moving system of coordinates associated with the hanging container, from the readings of the strain gages ($SG_{1,1}$, $SG_{2,1}$, $SG_{1,2}$, $SG_{2,2}$);

(b) Defining the angle $\psi$ from the readings of the accelerometers 310C_1, 310C_2, 310C_3, 310C_4;

(c) Defining $\psi'$ and $\psi''$ from the readings of the accelerometers 310C_1, 310C_2, 310C_3, 310C_4;

(d) Defining $\vec{F}_1$, $\vec{F}_2$ in a stationary system of coordinates from the results of the above steps (a) and (b);

(e) Defining acceleration of the container mass center in accordance with the following equation:

$$\vec{a}_O = \frac{\vec{F}_1 + \vec{F}_2}{m} + g,$$

where m is the container mass, defined for the stationary loaded container $$\left( m = \frac{SG_{1,1} + SG_{2,1}}{g} \right);$$

and g is the acceleration of gravity;

(f) Defining acceleration of points $O_1$ and $O_2$ (in a stationary system of coordinates) from the readings of the accelerometers 310C_1, 310C_2, and the angle $\psi$: $\vec{a}_1$, $\vec{a}_2$; and (g) Defining $-\vec{R}_{OO1}$ from $\vec{a}_1$, $\vec{a}_O$, $\psi'$, $\psi''$; and defining $-\vec{R}_{OO2}$ from $\vec{a}_2$, $\vec{a}_O$, $\psi'$, $\psi''$.

When the CSD 140 determines an overall container alert signal based on the decision of the integrated sensor processing procedure 470 (shown in FIG. 4), the microcontroller 330 activates one or more local alert mechanisms (e.g., sound devices 320A and/or light device 320B, as shown in FIG. 3) that generate a local alarm signal. The microcontroller 330 may also activate transceivers 350A-350C to transmit a message that includes this alert via antennas 360B-360D to the Bridge 150 and/or the NOC 170. The microcontroller 330 also determines time intervals used to activate the transceivers 350A-350C during communication with the Bridge 150 or the NOC 170. In one example, these time intervals may be determined by the NOC 170.

The CSD 140 may be coupled to the wall of the container 130 in any conventional manner. By way of example, the CSD 140 may be coupled to the wall of the container 13 by rare earth magnets, double-stick tape, and/or hot-glue.

Figure 27:
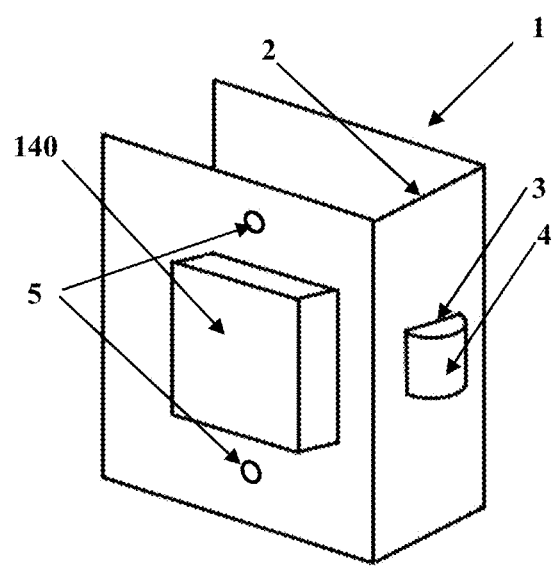
FIG. 27 is an exemplary detail drawing illustrating a perspective view of a mounting device for attaching an electronic device to a cargo container, wherein a portion of a flat spring coupled to the mounting device is shown as extending through a square-shaped opening of the mounting device.

The CSD 140 may also be coupled to the container 130 by a mounting device. According to one embodiment, the CSD 140 may be mounted on a door 9 of the container 130 using a mounting device 1, as illustrated in FIGS. 27 and 28(a),(b). The mounting device 1 of FIGS. 27 and 28(a),(b) is shown as having a U-shaped bracket 2 with a first lateral side, a second lateral side, and a central portion disposed between the first and second lateral side. The U-shaped bracket 2 can be configured to couple with an edge of the cargo container door 9 in any conventional manner. For example, the U-shaped bracket 2 may be coupled to the edge of the cargo container door 9 by rare earth magnets, double-stick tape, hot-glue, clamps, nails, etc. The U-shaped bracket 2 may also be advantageously-sized to correspond to the size of the cargo container door 9 such that the U-shaped bracket 2 fits snugly over the edge of the cargo container door 9. According to the present embodiment of FIGS. 27, 28(a),(b), two threaded openings 5 can be formed on the first lateral side of the U-shaped bracket 2. The threaded openings 5 are configured to receive fasteners, such as threaded screws 6, for securing the mounting device 1 against the container door 9. Thus, the U-shaped bracket 2 clamps to the edge of the door 9. The threaded screws 6 of FIG. 28(a),(b) are shown as having flat ends that secure against the side of the container door 9. This method of fixation, i.e., using threaded screws 6 with flat ends, is advantageous because no fastening openings are needed on the wall of the container 130 to receive the threaded screws.

As illustrated in FIGS. 27 and 28(a),(b), the CSD 140 is coupled to the same lateral side of the U-shaped bracket 2 that is configured with the threaded openings 5. And as further illustrated in FIG. 28, the U-shaped bracket 2 is positioned on the door 9 in such a manner that the CSD 140 and the threaded opening/screw configuration are located inside the cargo container 130. Advantageously positioning the CSD 140 and the securing means of the mounting device 1 on the inside of the container 130, as illustrated in FIG. 28(a),(b), may prevent tampering and destruction of the mounting device 1 when the container doors 9, 10 are closed. For example, as can be seen from FIG. 28(a), the CSD 140 is safely retained within the container 130 when container doors 9,10 are closed, and cannot be reached or dismounted from the outside.

In one embodiment, the CSD 140 includes a magnetically-operated switch 8 for activating and deactivating the CSD 140. According to one embodiment, mounting device 1 comprises a flat spring 4 configured to interact with magnetically-operated switch 8 based on the opening and closing of the second container door 10. As illustrated in the embodiment of FIG. 28(a),(b), one end of the flat spring 4 is attached to the lateral side of the U-shaped bracket 2 that is secured to the outside wall of the first door 9. A magnet 7, which interacts with the magnetically-operated switch, is attached to the other (free) end of the flat spring 4. The magnet 7 is adapted to turn on and off the magnetically-operated switch 8. According to the embodiment of FIGS. 27 & 28(a),(b), the U-shaped bracket 2 includes a square-shaped opening 3 on the central portion of the bracket 2 for partially receiving the flat spring 4. As illustrated in FIGS. 27 & 28(a)(b), the opening 3 allows the central portion of the flat spring 4 to extend through the opening 3 outside the bracket 2.

The opening 3 is configured in such a manner that the central portion of the flat spring 4 extends towards the second container door 10 when the mounting device 1 is coupled to the first door 9. Thus, when the doors 9, 10 of the container 130 are closed, as shown in FIG. 28(a), the central portion of the flat spring 4 is pressed by the second door 10. Normally, when the second door 10 is open, as shown in FIG. 28(b), the flat spring 4 remains in a neutral state, i.e., the central portion of the flat spring 4 is not pressed by the second door 10, and the magnet 7 on the end of the flat spring 4 is in interaction with the magnetically-operated switch 8. In this neutral state, as depicted in FIG. 28(b), the magnetically-operated switch 8 is turned off, and the CSD 140 is deactivated. When the second door 10 is closed, as shown in FIG. 28(b), and the magnet 7 is displaced out of magnetic interaction with the magnetically-operated switch 8, the magnetically-operated switch 8 is turned on, and the CSD 140 is activated. When the second door 10 is opened again, the flat spring 4 returns back into its neutral state and brings the magnet 7 back into magnetic interaction with the magnetically-operated switch 8. Thus, according to the present embodiment, the CSD 140 is activated automatically when container doors 9, 10 are closed, effectively eliminating any gap in time between the moment the container 130 is closed and the moment the CSD 140 is activated. Hence, abuse is prevented. Further, the mounting device is easy to install.

The power unit 370 (shown in FIG. 3) of the CSD 140 may include one or more storage batteries 370A (shown in FIG. 3). The power unit 370 may also be configured to receive electrical power from a power source of the cargo transport vehicle. In this case, if the power source is interrupted, the power unit 370 may revert to use of the storage batteries 370A and/or solar power, for example. In the event of a power interruption or if the storage battery charge falls below a threshold level, the CSD 140 may transmit, via antennas 360 (shown in FIG. 3), a power interrupt alarm to the Bridge 150 and/or the NOC 170.

The microcontroller 330 may also implement power-management techniques to reduce power consumption. For example, one or more time windows may be specified, during initialization process or via transceivers 350A-350C, to define activation times for one or more components of the CSD 140. When not operating, (i.e., when outside the specified time windows), the CSD 140 may switch into a sleep (or low-power or suspend) mode to avoid unnecessary power utilization. In fact, sleep mode may account for a significant part of the life of the CSD 140; the CSD 140 may operate over several years without need of storage battery replacement. In one example of operation, the CSD 140 remains awake (i.e., does not switch to sleep mode) when communicating with the Bridge 150 and/or the NOC 170. If the CSD 140 does not receive a signal from the Bridge 150 or the NOC 170, the CSD 140 will only stay awake as long as necessary to insure that no signal is present during a time windows specified. The CSD 140 may also switch from sleep to awake mode if any one anti-tamper sensor of block 310 exceeds a certain threshold level.

Figure 18:
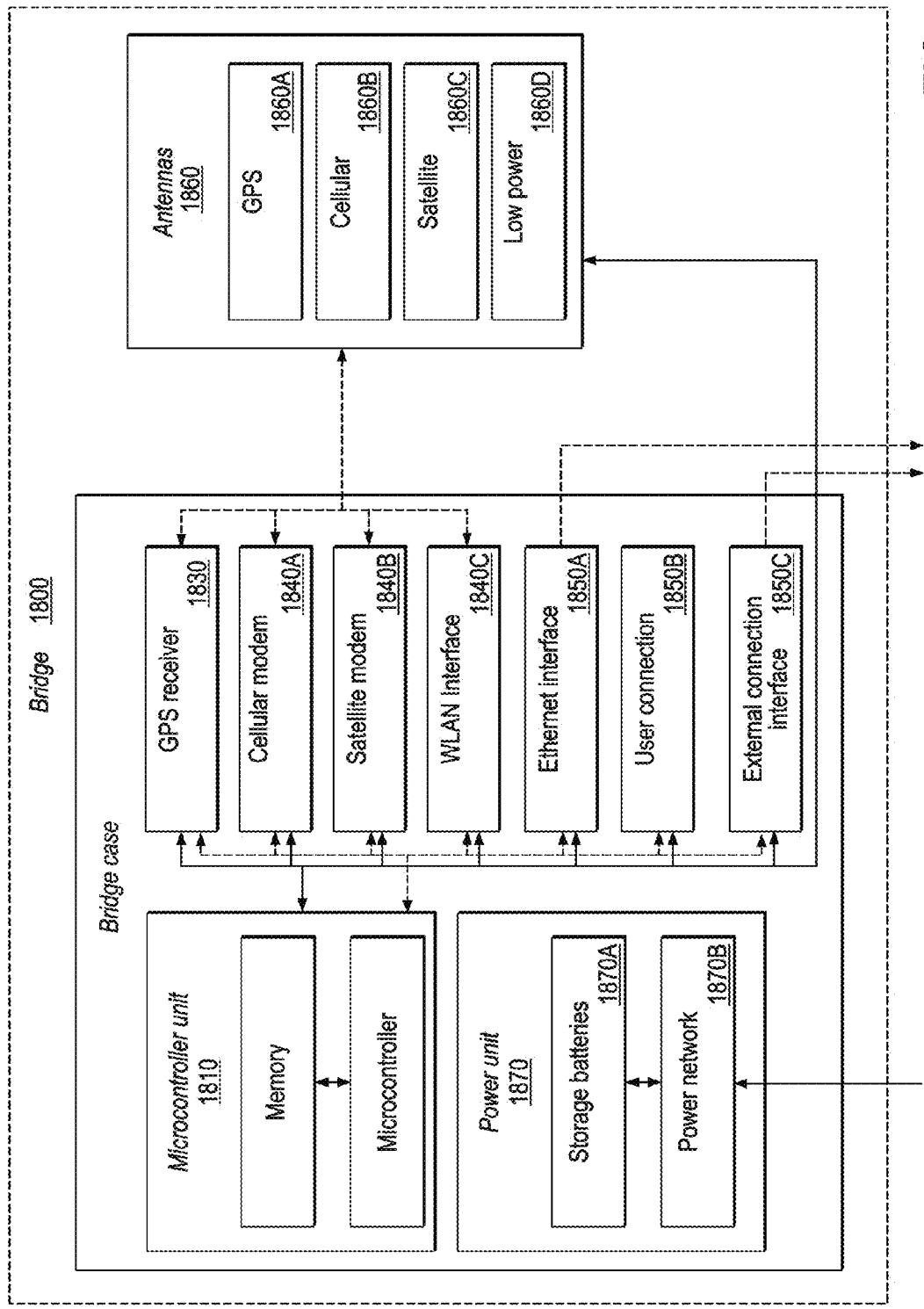
FIG. 18 shows a block diagram of one exemplary bridge.

FIG. 18 shows a block diagram illustrating one exemplary Bridge 1800. Bridge 1800 may, for example, represent bridge 150 of FIG. 1. The Bridge 1800 comprises a Microcontroller unit 1810, GPS receiver 1830, Cellular Modem 1840A, Satellite Modem 1840B, WLAN Interface 1840C, ethernet interface 1850A, User interface 1850B, External connection interface 1850C, Antennas Block 1860 and Power Unit 1870. The block of Antennas 1860 includes GPS antenna 1860A, Cellular antenna 1860B, Satellite antenna 1860C, and International Frequency Band Local Area Communication antenna 1860D. The Cellular modem 1840A is utilized to communicate with the NOC 170 via cellular communication channel 160A, for example. The Satellite modem 1840B is utilized to communicate with the NOC 170 via satellite communication channel 160B, for example. The WLAN interface 1840C is utilized to communicate with the CSD 140 via LAN 160C. The CSD 140 communicates to the NOC 170 via the Bridge 1800. Communication from the CSD 140 to the NOC 170 is less costly when the Bridge 1800 is utilized to relay the communication, as compared to when the CSD 140 communicates with the NOC 170 via cellular or satellite communications channels. In one example, the CSD 140 transmits the system status, including any alert status, to the Bridge 1800 upon request of the NOC 170.

The Bridge 1800 includes a power unit 1870, which may receive power from a power network 1870B. In the event that this power network 1870B is interrupted, the power unit 1870 may be configured to switch over to utilize Storage batteries 1870A. This power interruption may be detected by the microcontroller unit 1810, for example, which may transmit an alarm message to the NOC 170. The alarm message may, for example, identify the bridge 1800 by an identification code, the location of the ship provided by the GPS receiver 1830, the date and time of the alarm, and further description of the alarm event (e.g., loss of ship's power).

Figure 19:
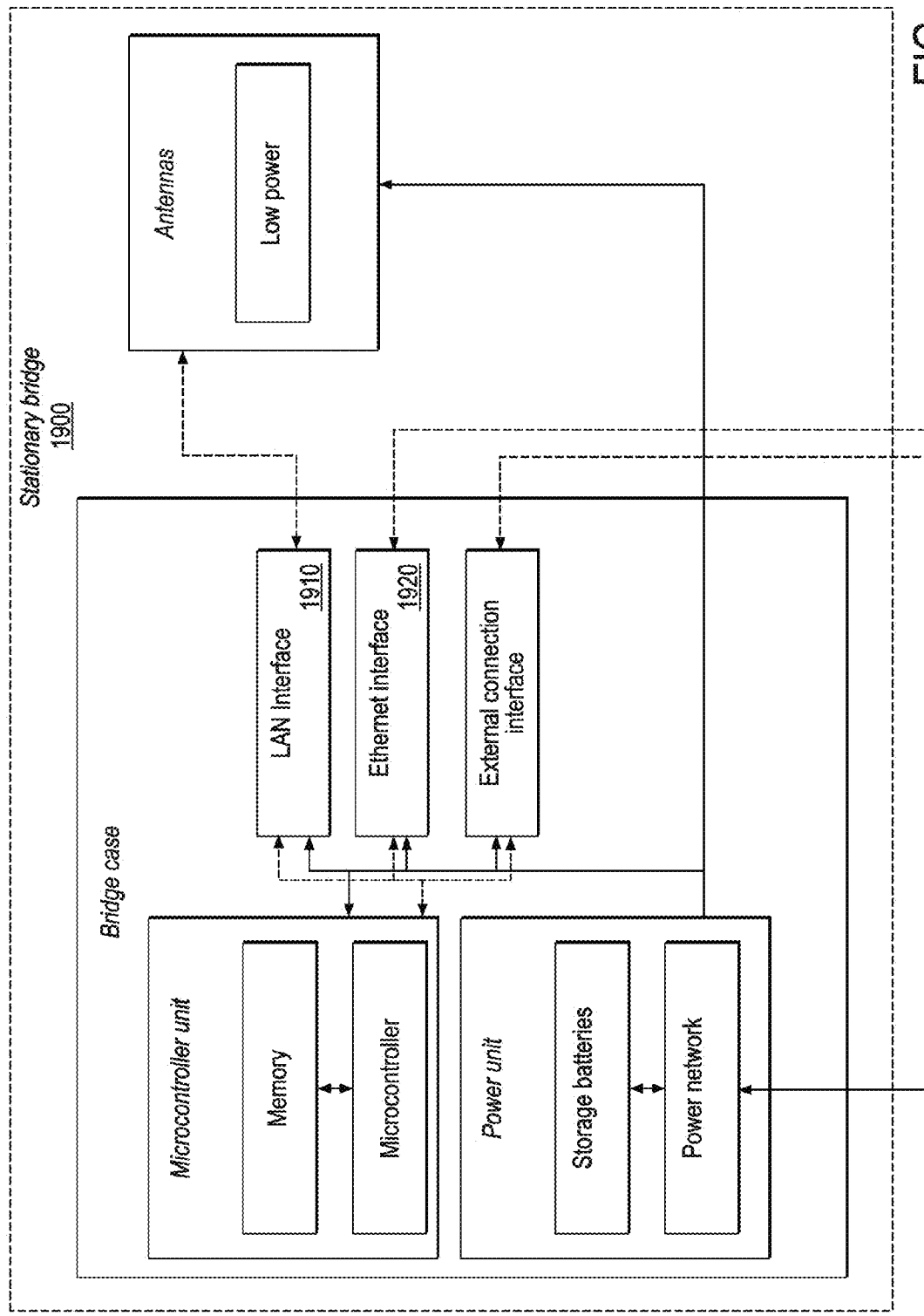
FIG. 19 shows a block diagram of the bridge, depicted in FIG. 18, when stationary.

FIG. 19 is an exemplary block diagram illustrating an embodiment Stationary Bridge 1900. The Stationary Bridge 1900 may be placed in the areas of high container concentration, such as places of consolidation/deconsolidation of containers, ports, terminals, etc. The Stationary Bridge 1900 may be used for continuous communication with the NOC 170. Stationary Bridge 1900 comprises the WLAN Interface 1910 and the Ethernet interface 1920. In one embodiment, the Stationary Bridge 1900 may not include a user interface. Further, since the geographical location of the Stationary Bridge 1900 remains the same, it may not require a GPS receiver.

Figure 20:
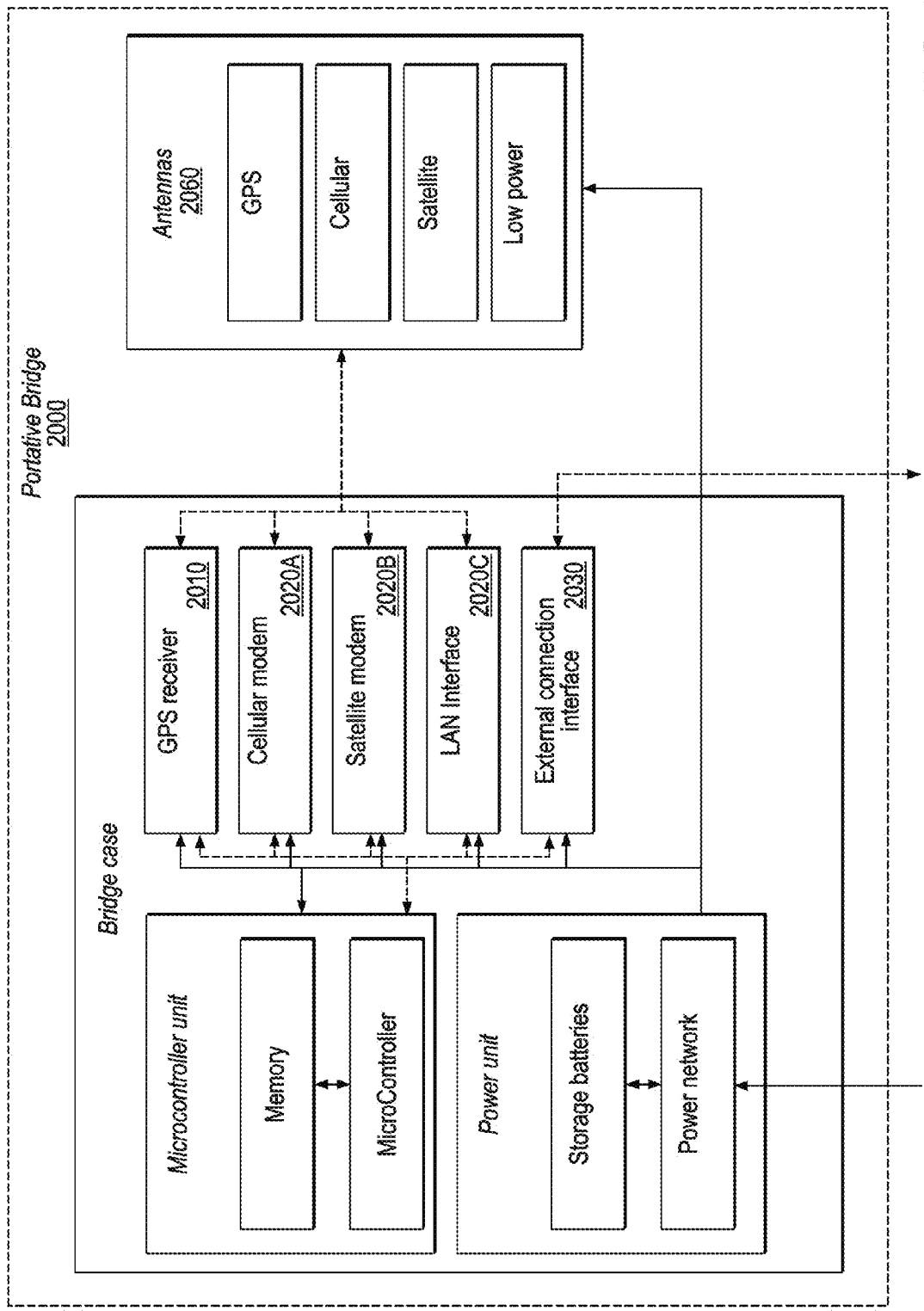
FIG. 20 shows a block diagram of one exemplary portative bridge depicted in FIG. 18.

FIG. 20 is an exemplary block diagram illustrating an embodiment of Portative Bridge 2000. The Portative Bridge 2000 may be used where containers are transported, such as on ships, trains, etc. The Portative Bridge 2000 comprises a GPS receiver 2010, a Cellular Modem 2020A, a Satellite modem 2020B, a WLAN 2020C, an External connection interface 2030 and an Antenna Block 2060. In communicating with the NOC 170, the Portative Bridge 2000 uses cellular 160A and satellite 160B communication channels. In one embodiment, the Portative Bridge 2000 may not have a user interface.

Figure 21:
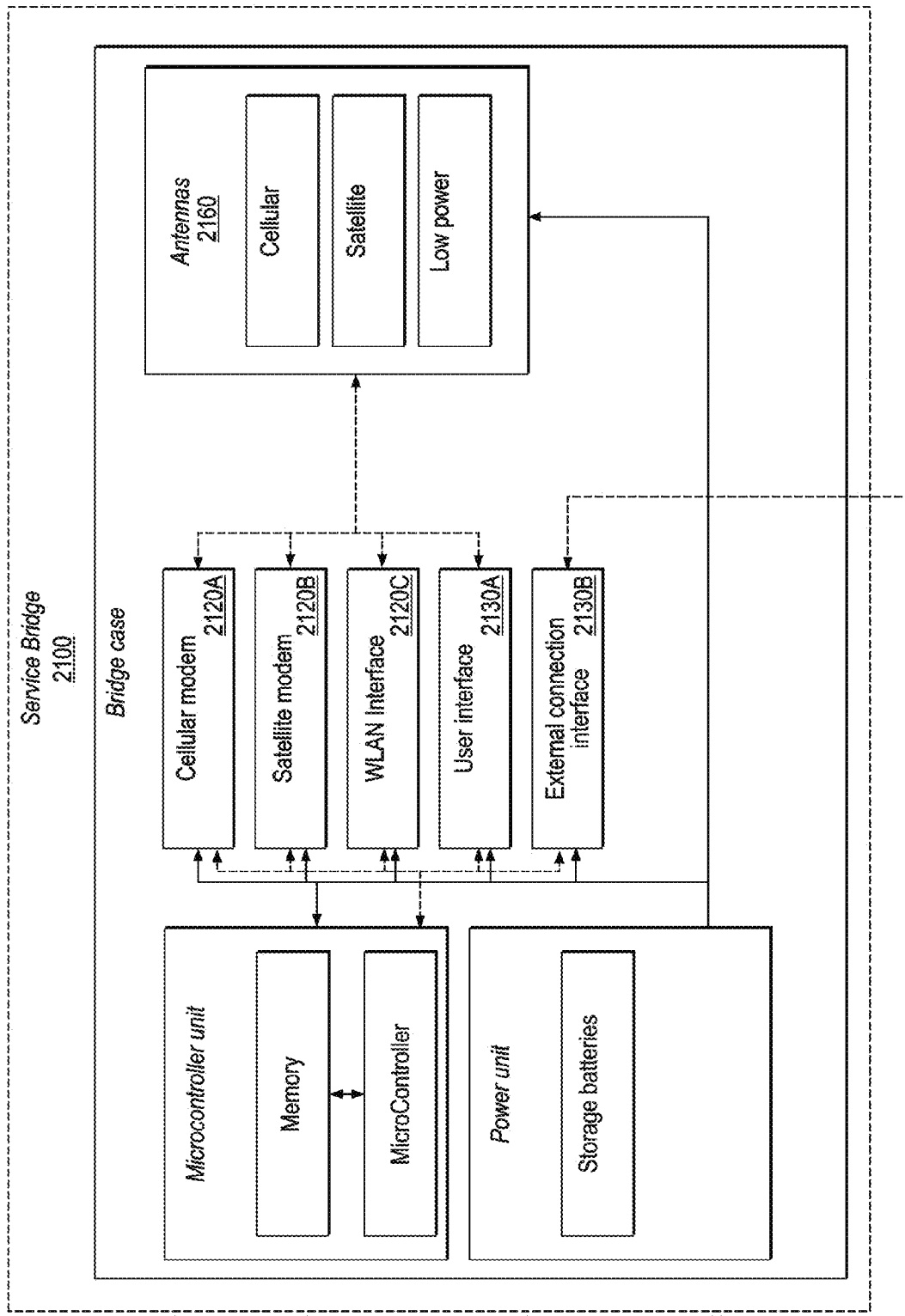
FIG. 21 shows a block diagram of one exemplary service bridge depicted in FIG. 18.

FIG. 21 is an exemplary block diagram illustrating an embodiment of Service Bridge 2100. The Service Bridge 2100 may be used to support and communicate with at least one CSD 140. The Service Bridge 2100 may comprise a cellular modem 2120A, a satellite-modem 2120B, a WLAN 2120C, a user interface 2130A, an External connection interface 2130B, and an Antenna block 2160. The service Bridge 2100 may communicate with the NOC 170 via other Stationary and/or Portative Bridges (e.g., portative bridge 1100) using UBFT 160C and/or through the Cellular 160A and/or satellite 160B communication channels.

Figure 22:
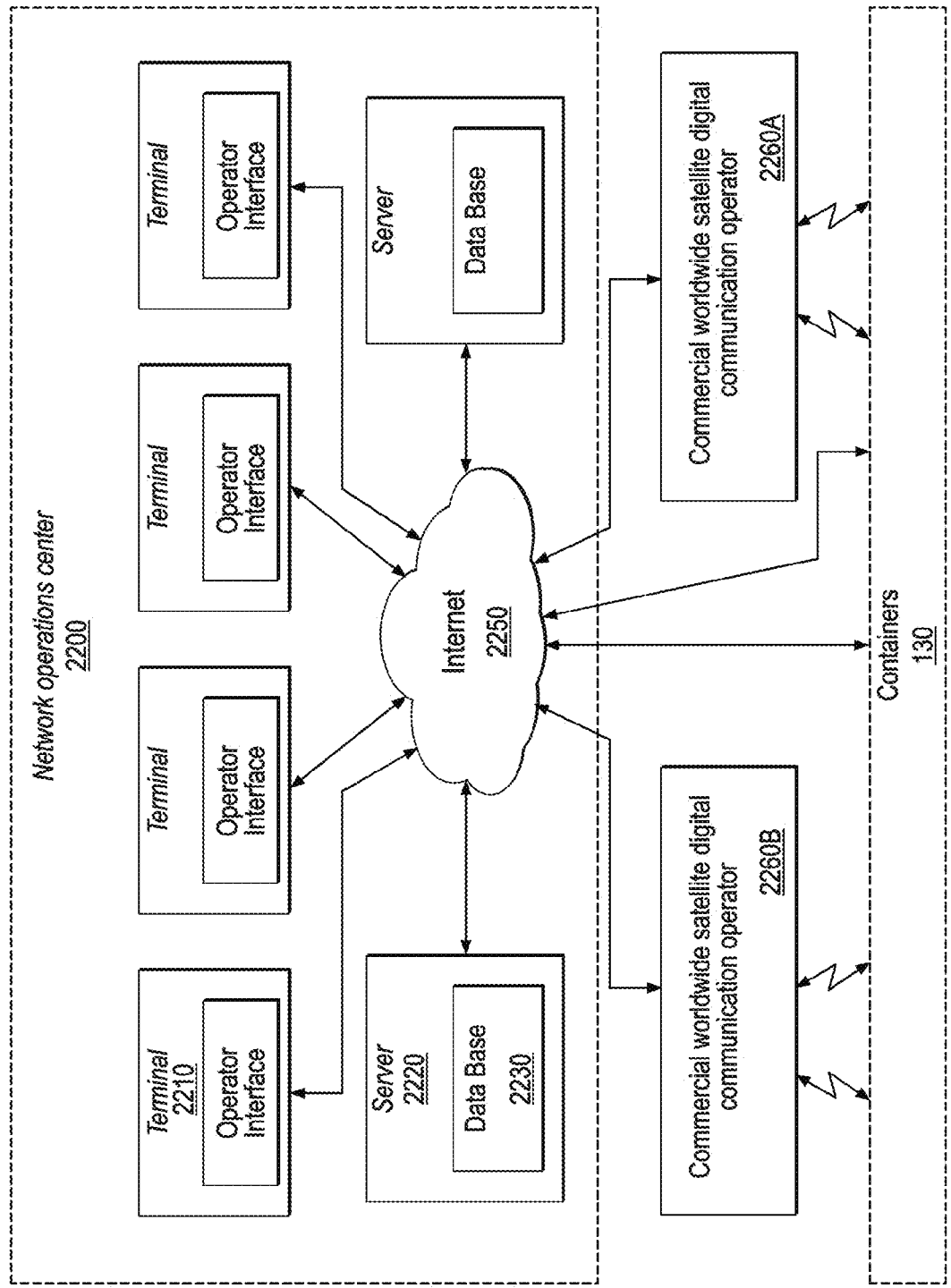
FIG. 22 shows a diagramed depiction of one exemplary Network Operations Center depicted in FIG. 1.

FIG. 22 is an exemplary diagram illustrating an embodiment NOC 2200. The NOC 2200 may, for example, represent NOC 170 of FIG. 1. The NOC 2200 may comprise a plurality of terminals 2210 and servers 2220 interconnected via Internet 2250. The servers 2220 may include a Data Base 2230. The data base 2230 may, for example, be used to store sensor data and may contain archives of container events received from at least one CSD 140. The data base 2230 may also store information pertaining to the location and condition of cargo containers. The NOC 170 may use the services of a Commercial world wide digital cellular communication operator 2260A, configured to communicate with the CSD 140 and/or the Bridge 150 via the cellular communication channels 160A. The NOC 170 may also use the service of a Commercial world wide satellite digital communication operator 2260B that is configured to communicate with the CSD 140 and/or the Bridge 150 via satellite communication channels 160B.

Figure 23:
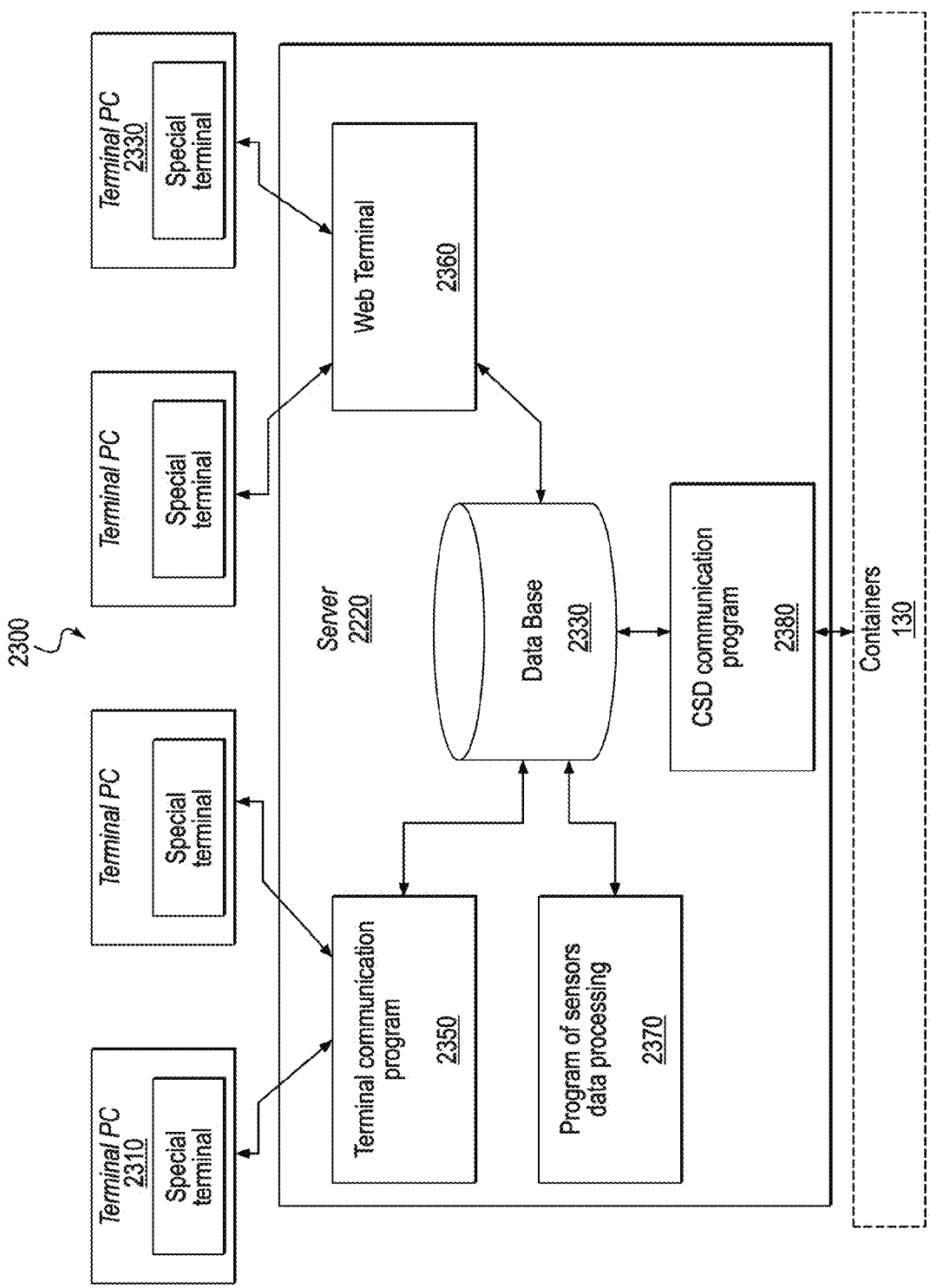
FIG. 23 shows a diagramed depiction of one exemplary NOC server depicted in FIG. 22.

FIG. 23 is a detailed diagram illustrating an embodiment of the system server 2220, wherein the system server 2220 is illustrated as interacting with other system elements. The system server 2220 may comprise a software complex and a database 2230. Generally, the system server 2220 includes the following software: database, program for communication with CSD 2380, programs for communication with operator terminals 2350, and program for analysis of CSD sensor data 2370.

The database 2230 comprises identification and custom data of secured objects, their condition, CSD operation parameters and commands issued to security modules by system operators. The database can also include data from CSD sensors for its further detailed examination by server means.

The CSD communication program 2380 receives CSD data during communication session established directly or via bridge, moves the data to server database, extracts operator commands and required service data from the database and sends them to modules.

The operator terminal communication program 2350 could be used for data exchange with custom terminal programs installed on user computers, or for development of web interface accessible by any authorized user from any computer without dedicated software installed. Accordingly, there can be two types of operator terminals: a computer with terminal application installed 2310; and a computer with a web browser 2330. The computer with terminal application installed 2310 has the advantage of quick data exchange. The computer with web browser 2330 provides easy access to the system. Both applications handle operator commands issuing to CSD, their saving in the database and transfer of information about secured objects from database to operator terminals.

The CSD sensor data analysis program 2370 is used when CSD software is incapable of processing sensor data to the level sufficient for deciding on the condition of a secured object due to its limited computing performance. The CSD sensor data analysis program extracts CSD sensor data from the database, processes it and concludes about the condition of CSD and secured object. Calculation results are stored in server database 2230.

Figure 24:
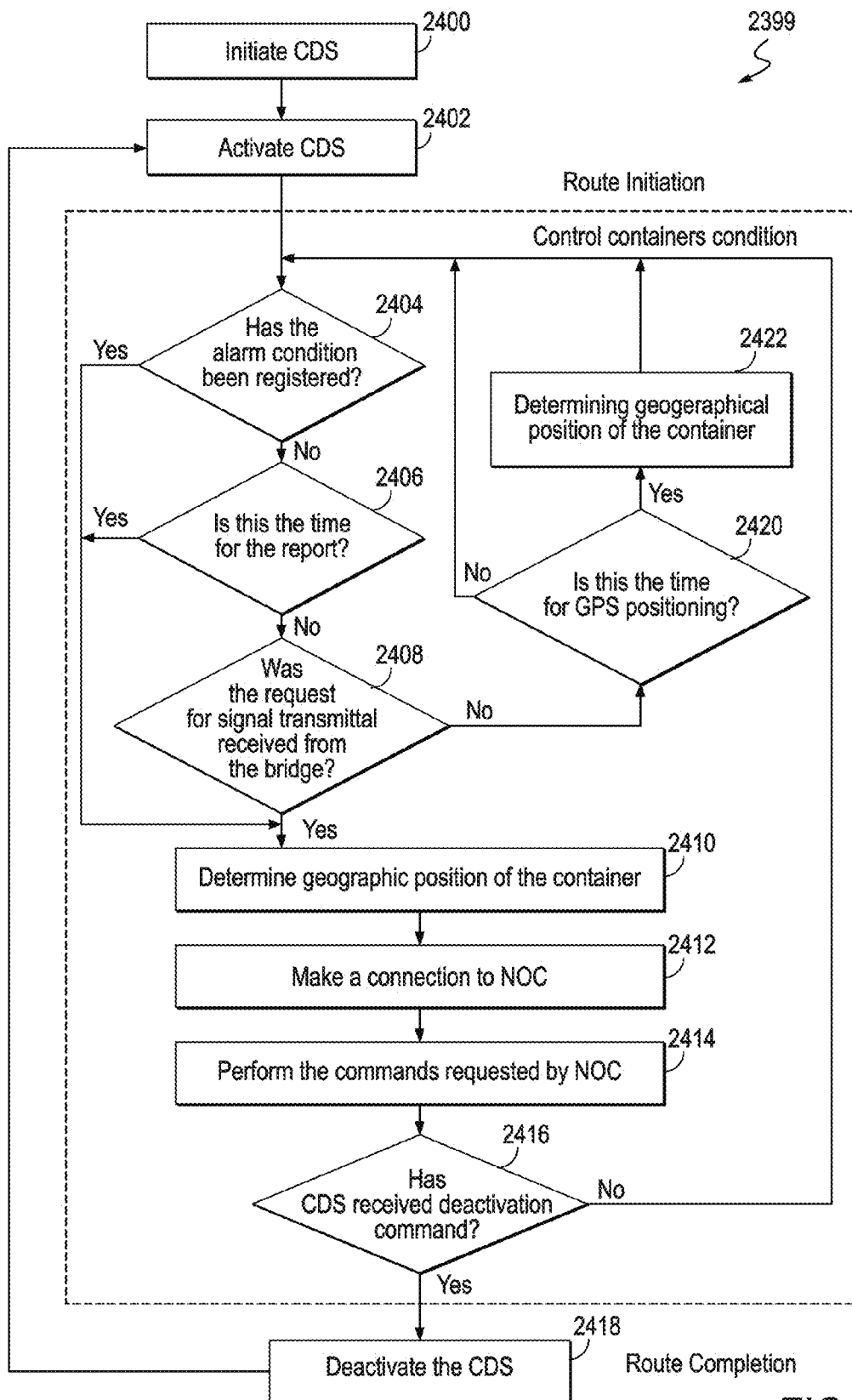
FIG. 24 shows a flowchart showing one exemplary method for monitoring container integrity.

FIG. 24 is an exemplary flowchart illustrating an embodiment of method 2399 for monitoring container integrity. When production of the CSD 140 takes place, the CSD 140 gets initiated at 2400. The initiation at 2400 includes a data packet that is downloaded into the microcontroller 330 of CSD 140. The data packet includes certain parameters that remain unchanged during the lifetime of the CSD 140. These parameters include an identification code for the CSD 140, an address of a server that may be used to communicate with the CSD, and associated parameters of communication, etc. The initiation of the CSD 140 may, for example, be done by the Bridge 150 or other equipment (not shown).

The operation of the CSD 140 is cyclic. Each CSD 140 cycle lasts one container trip/route (i.e., from the moment of uploading to before the unloading of the container 130). At the route start, the CSD 140 is activated by the Bridge 150 or the NOC 170. During activation of the CSD 140, at 2402, the microcontroller 330 of CSD 140 is cleared of any previously stored information. New information pertaining to the container's route and movement schedule, as well as parameters and logic that use regimes pertaining to the safety of the container 130, are downloaded into the microcontroller 330. The CSD 140 is placed in the active mode, at 2402, by the Bridge 150 or by the server 2220 of the NOC 170.

During the container's route, condition of the container 130 and its cargo are continually or periodically monitored. During the container's route, the microcontroller 330 of the CSD 140 checks for an alert status from the integrated sensor processing procedure 470 at 2404. Then, at 2406, the microcontroller 330 checks if it is a time for the packet of the information pertaining to the container's condition to be sent to the NOC 170. Then at 2408, the microcontroller 330 also checks if the request for communication with the NOC 170 was received from the Bridge 150. If the NOC 170 receives a message containing an alert status from the CSD 140, the NOC 170 sends a request to the GPS receiver 340 of the CSD 140. In response to this request, the GPS receiver 340 determines the geographical location of the CSD 140 at 2410 and sends this location information to the microcontroller 330.

The CSD 140 may also determine its geographical location by requesting location information from the bridge 150. The microcontroller 330 may also periodically request location information from either the GPS receiver 340 or the bridge 150. When the microcontroller 330 sends the request to the GPS receiver 340 at 2420, the GPS receiver 340 determines the geographical position of the container 130 at 2422.

At 2412, the CSD 140 establishes connection to the NOC 170. The CSD 140 communicates with the NOC 170 through the Bridge 150 using Unlicensed International Frequency Band Local Area Communication Network 160C. However, if the CSD 140 unable to communicate with the NOC 170 through the Bridge 150, The CSD 140 may communicate with the NOC 170 via cellular communications channels 160A or satellite communications channels 160B. The CSD's communication via the Bridge 150 may be less expensive and may also save energy, as compared to contacting the NOC 170 directly via cellular 160A or satellite 160B communication channels.

During communication, at 2412, between the CSD 140 and the NOC 170, the CSD 140 sends the information packet to the NOC 170. This packet may include one or more of the transmission time, the channel of communication, level of batteries charge, location of the CSD 140, etc. In response to this information, the NOC 170 requests that the CSD 140 perform certain commands, at 2414, pertaining to further operation of the CSD 140, including a regime for monitoring the container's safety, etc. In one example, the CSD 140 may receive a command from the NOC 170 to deactivate the CSD 140. At 2416, the CSD 140 verifies that the received command is a deactivation command and, if it is, the CSD 140 deactivates at 2418; otherwise at 2404-2416, steps are performed continually until a deactivation command is received. In one example, the CSD 140 may deactivate at route completion before the cargo is unloaded. During this deactivation period, the CSD 140 ceases to monitor containers and cargo safety.

The proposed system could be employed not only for providing security to general ISO containers, but also for ensuring safety of other moving objects, such as vehicles, boats, etc., as well as of remote fixed objects, e.g. country houses. The difference in these cases is the mobile module at secured object.

Figure 25:
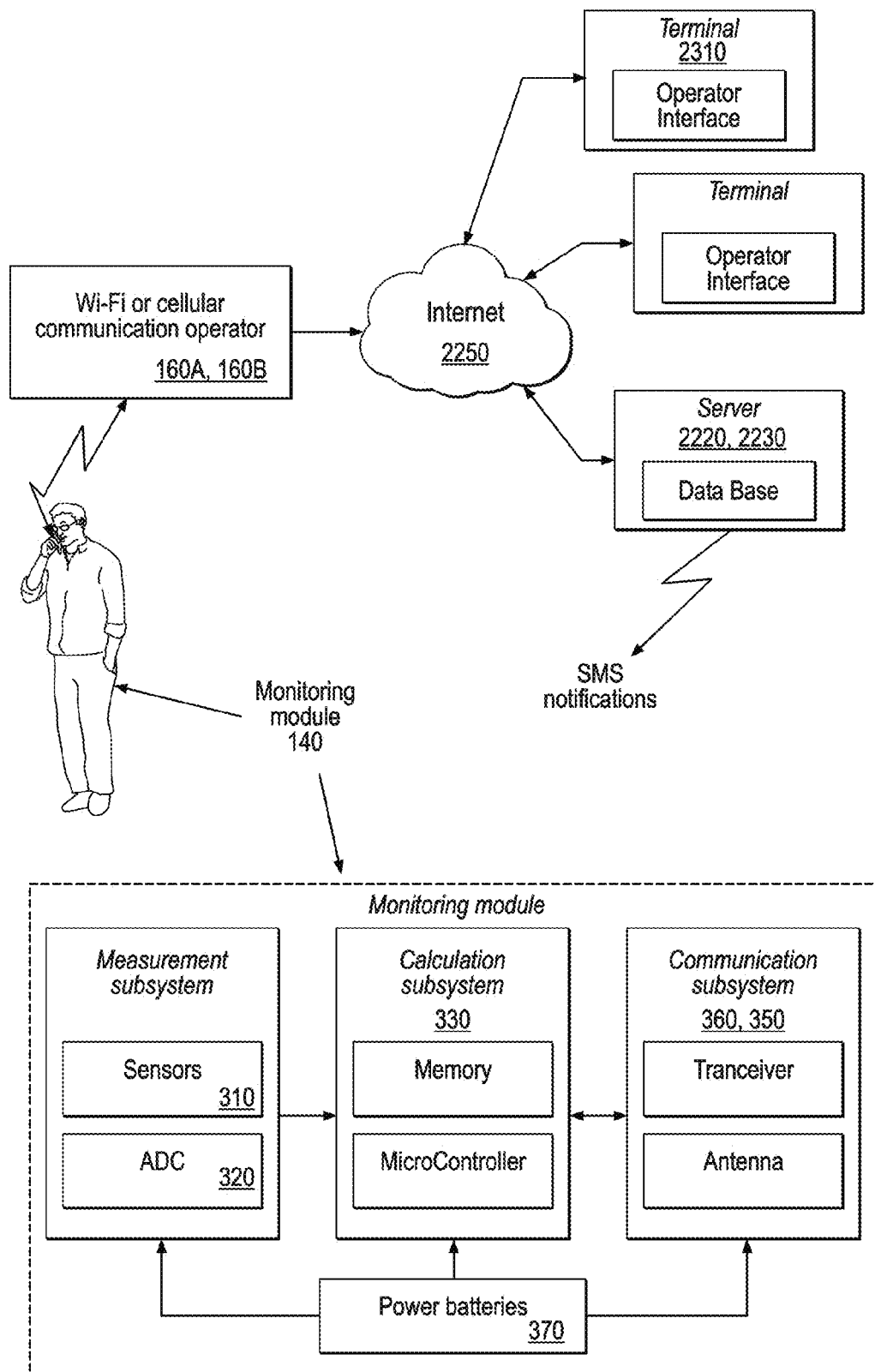
FIG. 25 shows a diagramed depiction of personal conditions monitoring system.

FIG. 25 is an exemplary diagram illustrating an embodiment of a personal conditions monitoring system 2500. The personal conditions monitoring system 2500 could be employed for monitoring health conditions and accumulated workload of physically-weakened persons, those in need for constant medical supervision, as well as specialists directly engaged in potentially-dangerous activities. For example, the personal conditions monitoring system 2500 can be used with military and special services personnel, professional drivers, athletes, alpinists, etc. Generally, security module could be used for monitoring personal conditions, accumulated physical load, for recording events occurred to the person (falling, impacts, changes of position of the body, traveling in transport, etc.), as well as for recording events in the immediate vicinity of the person (gunshots, explosions, changes of temperature and humidity, etc.).

Monitoring module, for example could be the CSD 140, which comprises the sensor array 310 and ADC 320, computing subsystem comprised of the microcontroller 330 and memory unit, communication subsystem including the transceiver 350 and the antenna 360, and power subsystem with replaceable batteries 370. The combination of sensors is determined by the purpose of the module. For most applications, the accelerometers 310C could be used as they enable to monitor position and movement of a person, his pulse and a number of events in the surroundings, and electrodes for measuring amplitude-time parameters of heart biopotentials (ECG), and electrical impedance of the body to automatically estimate functional state of cardiovascular system on the basis of data obtained in examination of electrical activity of the heart, type of vegetative regulation of the rhythm and central gemodynamic parameters obtained in automatic syndromal ECG diagnostics, heart rate variability analysis and impedancegram analysis of the body.

In its operation, monitoring module continuously monitors sensor indications, performs initial processing of measured values, concludes about the condition of the person or events occurred to him, and sends data to the server 2220. Data is sent to server if personal conditions have changed or when certain emergency events occur, and periodically, e.g. hourly. Data is transferred over a wireless Wi-Fi based link 160C or using cellular networks 1608. The server 2220 receives information from the monitoring module 140, performs its additional processing if necessary, and stores it in the database 2230. In emergency cases, server sends SMS notification to phone numbers specified for the person. Terminal program displays all data on the terminal 2310 available at the server in real-time, notifying operator in emergency if necessary.

It should be noted that the matter contained in the above description or shown in the accompanying drawings should be interpreted as illustrative and not in a limited sense. The following claims are intended to cover all generic and specific features described herein, as well as all statements of the scope of the present method and system, which, as a matter of language, might be said to fall there between.

What is claimed is:

1. A security system for monitoring at least one cargo container, the system comprising:
   a container security device for detecting a tampering violation of a selected cargo container, said container security device being removably coupled with the selected cargo container and including:
   at least one anti-tamper sensor for generating output data that undergoes an individual sensor processing procedure and an integrated sensor processing procedure for determining a container alert status;

a microcontroller for generating the container alert status from the output data;

a communication device for transmitting at least one of the output data and the container alert status; and a plurality of accelerometers and a plurality of strain gages for defining a moment of inertia of the cargo container, said plurality of accelerometers having a first accelerometer being coupled with said container security device at a location distal from a second accelerometer disposed within the cargo container; and a network operations center for receiving at least one of the output data and the container alert stats from said container security device and comprising a communications facility for communicating with at least one telecommunication network.

2. The security system of claim 1, wherein said communication device communicates the output data and the container alert status to the network operations center via at least one of a satellite communication channel and a cellular communication channel.

3. The security system of claim 1, wherein the container security device is configured for monitoring cargo inside the cargo container.

4. The security system of claim 3, wherein said plurality of accelerometers and said plurality of strain gages determine at least one of a cargo mass and a mass distribution of the cargo container.

5. The security system of claim 1, wherein the container security device is configured for detecting at least partial destruction of a wall of the cargo container.

6. The security system of claim 1, wherein the moment of inertia of the cargo container is used to create a digital signature of the cargo container.

7. The security system of claim 1, wherein the network operations center further comprises a data storage medium for storing at least one of the output data, the container alert status, and an archive of container events.

8. The security system of claim 1, wherein said container alert status is an alarm transmission.

\* \* \* \* \*